(12) United States Patent
O'Neill

(10) Patent No.: US 8,179,840 B2
(45) Date of Patent: May 15, 2012

(54) METHOD FOR EXTENDING MOBILE IP AND AAA TO ENABLE INTEGRATED SUPPORT FOR LOCAL ACCESS AND ROAMING ACCESS CONNECTIVITY

(75) Inventor: Alan O'Neill, Henley Beach (AU)

(73) Assignee: Qualcomm Incorporated, San Diego, CA (US)

( * ) Notice: Subject to any disclaimer, the term of this patent is extended or adjusted under 35 U.S.C. 154(b) by 56 days.

(21) Appl. No.: 12/423,610

(22) Filed: Apr. 14, 2009

(65) Prior Publication Data
US 2009/0225688 A1      Sep. 10, 2009

Related U.S. Application Data

(63) Continuation of application No. 10/926,541, filed on Aug. 26, 2004, now Pat. No. 7,525,937, which is a continuation of application No. 10/357,265, filed on Feb. 3, 2003, now Pat. No. 6,785,256.

(60) Provisional application No. 60/354,195, filed on Feb. 4, 2002.

(51) Int. Cl.
*H04W 4/00*          (2009.01)
(52) U.S. Cl. ................. 370/328; 455/432.3; 455/433; 455/435.1
(58) Field of Classification Search .............. None
See application file for complete search history.

(56) References Cited

U.S. PATENT DOCUMENTS

| | | | |
|---|---|---|---|
| 4,833,701 A | 5/1989 | Comroe et al. | |
| 5,267,261 A | 11/1993 | Bkajebet, II et al. | |
| 5,491,835 A | 2/1996 | Sasuta et al. | |
| 5,572,528 A | 11/1996 | Shuen | |
| 5,594,948 A | 1/1997 | Talarmo et al. | |
| 5,901,362 A | 5/1999 | Cheung et al. | |
| 6,006,090 A | 12/1999 | Coleman et al. | |
| 6,097,966 A | 8/2000 | Hanley | |
| 6,137,791 A | 10/2000 | Frid | |
| 6,144,671 A | 11/2000 | Perinpanathan et al. | |
| 6,161,008 A | 12/2000 | Lee et al. | |
| 6,195,705 B1 | 2/2001 | Leung | |
| 6,256,300 B1 | 7/2001 | Ahmed et al. | |
| 6,298,234 B1 | 10/2001 | Brunner | |
| 6,308,267 B1 | 10/2001 | Gremmelmaier | |

(Continued)

FOREIGN PATENT DOCUMENTS
WO          95012297          5/1995

(Continued)

OTHER PUBLICATIONS

Baker, F., IETF, "RSVP Management information Base Using SMIv2," Network Working Group, Request for Comments: 2206, pp. 1-60 (Sep. 1997).

(Continued)

*Primary Examiner* — Brian Roberts
(74) *Attorney, Agent, or Firm* — Kam T. Tam

(57) ABSTRACT

This document describes a way to extend Mobile IP Authentication Authorization and Accounting (AAA) signaling to enable a node to request from a network operator combinations of home and local service capabilities (when roaming) in an efficient and scalable manner. It also enables the home and foreign service providers to constrain and account for actual services provided based on a combination of the foreign and home operator policy.

33 Claims, 12 Drawing Sheets

U.S. PATENT DOCUMENTS

| | | | |
|---|---|---|---|
| 6,366,561 | B1 | 4/2002 | Dender |
| 6,400,722 | B1 | 6/2002 | Chuah et al. |
| 6,434,134 | B1 | 8/2002 | La Porta et al. |
| 6,445,922 | B1 | 9/2002 | Hiller et al. |
| 6,446,127 | B1 | 9/2002 | Schuster et al. |
| 6,449,234 | B1 | 9/2002 | Ahn et al. |
| 6,466,964 | B1 | 10/2002 | Leung et al. |
| 6,496,505 | B2 | 12/2002 | La Porta et al. |
| 6,496,704 | B2 | 12/2002 | Yuan et al. |
| 6,510,153 | B1 | 1/2003 | Inoue et al. |
| 6,516,194 | B2 | 2/2003 | Hanson |
| 6,539,225 | B1 | 3/2003 | Lee |
| 6,563,919 | B1 | 5/2003 | Aravamudhan et al. |
| 6,578,085 | B1 | 6/2003 | Khalil et al. |
| 6,591,105 | B1 * | 7/2003 | Hussain et al. ............... 455/444 |
| 6,603,969 | B1 | 8/2003 | Vuoristo et al. |
| 6,611,547 | B1 | 8/2003 | Rauhala |
| 6,621,810 | B1 | 9/2003 | Leung |
| 6,657,992 | B1 | 12/2003 | Christie, IV |
| 6,708,031 | B2 | 3/2004 | Purnadi et al. |
| 6,754,482 | B1 * | 6/2004 | Torabi ............................ 455/410 |
| 6,763,007 | B1 | 7/2004 | La Porta et al. |
| 6,785,256 | B2 | 8/2004 | O'Neill |
| 6,842,456 | B1 | 1/2005 | Chen et al. |
| 6,862,446 | B2 | 3/2005 | O'Neill et al. |
| 6,917,605 | B2 | 7/2005 | Kakemizu et al. |
| 6,947,401 | B2 | 9/2005 | Malki et al. |
| 6,954,442 | B2 | 10/2005 | Tsirtsis et al. |
| 6,970,445 | B2 | 11/2005 | O'Neill et al. |
| 6,982,967 | B1 | 1/2006 | Leung |
| 6,987,771 | B2 | 1/2006 | Shimizu et al. |
| 6,990,339 | B2 | 1/2006 | Turanyi et al. |
| 6,992,994 | B2 | 1/2006 | Das et al. |
| 6,992,995 | B2 | 1/2006 | Agrawal et al. |
| 6,999,437 | B2 | 2/2006 | Krishnamurthi et al. |
| 6,999,763 | B2 | 2/2006 | Ramalho et al. |
| 7,042,879 | B2 | 5/2006 | Eschbach et al. |
| 7,068,640 | B2 | 6/2006 | Kakemizu et al. |
| 7,079,520 | B2 | 7/2006 | Feige |
| 7,082,114 | B1 | 7/2006 | Engwer et al. |
| 7,123,599 | B2 | 10/2006 | Yano et al. |
| 7,136,362 | B2 | 11/2006 | Chen |
| 7,136,365 | B2 | 11/2006 | Nakatsugawa et al. |
| 7,136,389 | B2 | 11/2006 | Shahrier et al. |
| 7,161,913 | B2 | 1/2007 | Jung |
| 7,193,977 | B2 | 3/2007 | Lim |
| 7,227,863 | B1 | 6/2007 | Leung |
| 7,257,402 | B2 | 8/2007 | Khalil et al. |
| 7,277,948 | B2 * | 10/2007 | Igarashi et al. ............... 709/227 |
| 7,301,952 | B2 | 11/2007 | Furukawa et al. |
| 7,313,628 | B2 | 12/2007 | Chaskar et al. |
| 7,366,145 | B2 | 4/2008 | Flinck |
| 2001/0016492 | A1 | 8/2001 | Igarashi et al. |
| 2002/0055971 | A1 | 5/2002 | Shahrier et al. |
| 2002/0080752 | A1 | 6/2002 | Johansson et al. |
| 2002/0136226 | A1 | 9/2002 | Christoffel et al. |
| 2002/0147820 | A1 | 10/2002 | Yokote |
| 2002/0199104 | A1 * | 12/2002 | Kakemizu et al. ............ 713/168 |
| 2003/0018810 | A1 | 1/2003 | Karagiannis et al. |
| 2003/0036374 | A1 | 2/2003 | English et al. |
| 2003/0079144 | A1 * | 4/2003 | Kakemizu et al. ............ 713/200 |
| 2003/0092441 | A1 * | 5/2003 | Taha et al. ..................... 455/433 |
| 2003/0137991 | A1 | 7/2003 | Doshi et al. |
| 2003/0157938 | A1 | 8/2003 | Haase et al. |
| 2003/0212800 | A1 | 11/2003 | Jones et al. |
| 2003/0214922 | A1 | 11/2003 | Shahrier |
| 2004/0018841 | A1 | 1/2004 | Trossen |
| 2004/0148428 | A1 | 7/2004 | Tsirtsis |
| 2004/0213181 | A1 | 10/2004 | Grech et al. |

FOREIGN PATENT DOCUMENTS

| | | |
|---|---|---|
| WO | 98047302 | 10/1998 |

OTHER PUBLICATIONS

Berger, L., "RSVP Refresh Overhead Reduction Extensions," IETF Network Working Group, Request for Comments: 2961, pp. 1-32 (Apr. 2001).

Berger, L., et al., "RSVP Extension for IPSEC Data Flow," IETF, Network Working Group, Request for Comments: 2207, pp. 1-14 (Sep. 1997).

Bob, L., et al, A Framework for End-to-End Perceived Quality of Service Negotiation, IETF Internet Draft, draft-bos-mmusicsdpqos-framework-00.txt, pp. 1-21(Nov. 2001).

Braden, R., "Resource Reservation Protocol (RSVP)—Ver. 1, Message Processing Rules," IETF, Network Working Group, Request for Comments: 2209, pp. 1-24 (Sep. 1997).

Braden, R., "Resource Reservation Protocol (RSVP)—Ver. 1 functional Specification". IETF, Network Working Group, Request for Comments: 2205, pp. 1-105 (Sep. 1997).

Camarillo, P., et al., Integration of Resource Management and SIP, IETF Internet Draft, draft-ietf-sip-manyfolks-resource-04.ps pp. 1-18. (Feb. 25, 2002).

Campbell, Andrew T., et al., "IP Micro-Mobility Protocols", ACM Sigmobile Mobile Computer and Communications Review (MC2R), vol. 4, pp. 34-64, (Oct. 2001).

Etri, "Source Specific Multicast (SSM) Explicit Multicast (Xcast)" pp. 1-27 (Copyright 2001 by ETRI).

Ho, "Integration AAA with Mobile IPv4", Internet Draft, pp. 1-59. (Apr. 2002).

Johnson, D. et al., "Mobility Support in IPv6", IETF Mobile IP Working Group, Feb. 26, 2003, downloaded from http://www.join,uni-muenster.de on Dec. 29, 2004, pp. 1-158.

Karagiannis, "Mobile IP, State of the Art Report," Ericsson, No. 3/0362-FCP NB 10288 UEN, pp. 1-63 (Jul. 1999).

Li, Yalun "Protocol Architecture for Univefsal Personal Computing" IEEE Journal on Selected Areas in Communications 15(8): 1467-1476 (1997).

Mankin, A., et al. "Resource ReSerVation Protocol (RSVP) Ver. 1, applicability Statement Some Guideline on Deployment", IETF, Network Working Group, Request for Comments: 2208, pp. 1-6 (Sep. 1997).

Marshall, W., et al., Integration of Resource Management and SIP, IETF Internet Draft, draft-ietf-sip-manyfolks-resource-02.txt, pp. 1-28 (Aug. 2001).

Moy, I., "OSPF Version 2", Network Group, Request Comments: 2328, pp. 1-244 (Apr. 1998).

Papalilo, D., et al. "Extending SIP for QoS Support" www.coritel.it/publications/IP_downlaod/papalilo-saisano-veltri.pdf, pp. 1-6, (Dec. 8, 2001).

Perkins, C., "IP Mobility Support", Network Working Group, Reqeuest for Comments: 2002, pp. 1-79 (Oct. 1996).

Perkins, C., "IP Mobility Support for IPv4", Network Working Group, Reqeust for Comments: 3220 downloaded from http://www.ietf.org pp. 1-92. (Dec. 29, 2004).

Rosenberg, J., et al., "SIP: Session Initiation Protocol", IETF, Network Working Group, Request for Comments: 3261, pp. 1-269 (printed as pp. 1-252) (Jun. 2002).

Schulzinne, Henning et al "Application-Layer Mobility Using SIP", 0-7803-7133 IEEE, pp. 29-36, (Jan. 2000).

Thulasi, Arun et al, Ipv6 Prefix Delegation Using ICMPv6, Network Working Group, pp. 1-33. (Apr. 2004).

TIE/EIA/IS-707A.8 "Data Service Options for Spread Spectrum Systems: Radio Link Protocol Type 2", pp. 1-1:4:12 (Mar. 1999).

Valko, Andras, "Cellular IP: A New Approach to Internet Host Mobility" Computer Communications Review 29(1): pp. 50-65 (1999).

Wedlund, Elin et al., "Mobility Support Using SIP", Proc. of ACM/IEEE Interntional Conference on Wireless and Mobile Multimedia (WoWMoM'99), Seattle Washington, (Aug. 1999).

Wroclawski, J., "The Use of RSVP with IEFT Integrated Services" IETF, Network Working Group Request for Comments: 2210, pp. 1-33.

Zhou S., et al., "A Location Mangement Scheme for Support Mobility in Wireless IP Networks Using Session Initiation Protocol (SIP)", 1531-2216/01 IEEE, pp. 486-491 (Oct. 2001).

* cited by examiner

METHOD FOR EXTENDING MOBILE IP AND AAA TO ENABLE INTEGRATED SUPPORT FOR LOCAL ACCESS AND ROAMING ACCESS CONNECTIVITY

RELATED APPLICATIONS

The present application is a continuation of allowed pending U.S. patent application Ser. No. 10/926,541, filed on Aug. 26, 2004 and titled A METHOD FOR EXTENDING MOBILE IP AND AAA TO ENABLE INTEGRATED SUPPORT FOR LOCAL ACCESS AND ROAMING ACCESS CONNECTIVITY, which is a continuation of U.S. Pat. No. 6,785,256, issued on Aug. 31, 2004 and titled A METHOD FOR EXTENDING MOBILE IP AND AAA TO ENABLE INTEGRATED SUPPORT FOR LOCAL ACCESS AND ROAMING ACCESS CONNECTIVITY, and both of which claim the benefit of U.S. Provisional Patent Application Ser. No. 60/354,195 filed Feb. 4, 2002 and titled METHOD FOR EXTENDING MOBILE IP TO ENABLE INTEGRATED SUPPORT FOR LOCAL ACCESS AND ROAMING ACCESS CONNECTIVITY, each of these applications is hereby expressly incorporated by reference.

FIELD OF THE INVENTION

The present invention is directed to methods and apparatus for establishing a data communication session and, more particularly, to methods and apparatus for establishing a data communication session through an access node in a multi-node network, e.g., a cellular network in which mobile end systems communicate with each other and other end systems through access nodes.

BACKGROUND

Internet Protocol (IP) technology is designed to enable packet-switched interconnection of a heterogeneous set of computers and communication networks. A potentially diverse set of network and link layer technologies are interconnected through nodes, e.g., gateways (or routers), that provide a packet forwarding service. Information is transferred between end nodes (or hosts) as blocks of data called datagrams, where source and destination hosts are identified by fixed length addresses. Routing in IP internetworks is connectionless in nature, in that datagrams are forwarded between routers on a hop-by-hop basis using the destination address in the datagram.

Mobile IP (MIP) (Ref: IETF RFC 2002) enables an IP host, also called a "mobile node" in the context of Mobile IP, to dynamically change its point of attachment to the network, yet remain contactable via a previously given "home address". To achieve this a temporary local address or "care of address" is associated with the mobile node when it visits a foreign network, also known as a visited network. In some cases the care of address is that of a "foreign agent" that assists in this process, while in other cases the care of address may be directly assigned to the mobile node. The care of address is registered back on the home network in a node referred to as the "home agent". The home agent intercepts packets destined to the home address of the mobile node and redirects the packets, by means of encapsulation and tunneling, towards the care of address associated with mobile node in the visited network. Upon delivery to the care of address, the encapsulation is removed and the original packet destined to the home address is delivered to the mobile node.

Accordingly, MIP enables a moving Internet host to connect to a Foreign Agent (FA) access router in a visited network, yet still be contactable on its persistent Home Address (HoA) that it uses on its home network and is likely contained in the DNS system. This is possible because the FA gives the host a temporary local address that is either unique to the host (Co-located Care of Address or CCoA) or is unique to the FA (Care of Address or CoA). In various applications, the FA registers its CoA into the HA for the HoA address of its attached MN. The HA then tunnels packets addressed to the HoA of MN to the Care of Address (CoA) of the FA. The FA forwards packets received from the MN HoA out to the Internet as normal or reverse tunnels the packets to the Home Agent. The network features associated with the local and remote services are necessarily different given that local access services are consumed in the home network whilst remote access services are provided by a visited network in conjunction with the home network. These network features are policed typically at an access router by comparing a service profile to the actions of the attached MN. The service profile is often stored in a service profile server in the home network and therefore needs to be retrieved from the home service profile server by the access router in the home or visited network in order to provide a service corresponding to a stored profile. Two service profiles however are required to be stored in the home service profile server. This is because the local and remote access service profiles are very different reflecting the fact that the remote access service is delivered to a visited network whose offered services and policies may be very different from the home network. It also reflects the fact that the MN is not given an IP address in the visited domain that can effectively be used as an application address because the local IP address does not survive hand-offs between access routers. The Home address does however survive hand-offs due to the updated CoA from the visited network.

In summary, when an MN is on its home network, then MIP provides local access service whilst when the MN is in a visited network then MIP provides remote access service back to the home network. A deficiency of MIP is that the MN cannot get local access service from a visited domain in conjunction with remote access back to a home domain. Nor is their adequate provision for the MN to be able to support multiple remote access services concurrently from one or more third party remote networks.

In view of the above discussion, it should be apparent that there is a need for extending MIP to support both local and remote access connectivity, e.g., concurrently. One aspect of this problem is that there needs to be a way for a MN to be able to request local and/or remote access service from the local access router, and for that access router to be able to fetch the associated service profiles from the correct service profile servers in a timely manner, and in such a way that multiple commercial models between the visited, home and third party networks can be supported. Assuming the required service profiles are retrieved, the access router can then provide the requested services to the MN while making sure the MN is limited to consuming visited network resources which it is authorized to use, e.g., resources for which the visited network will be reimbursed.

An Authentication, Authorization and Accounting (AAA) system is typically used to retrieve and transport authorized service profiles to the access router. A single Network Access Identifier is normally included in a MIP message extension of a message sent to an access router when a service is being requested. The NAI includes a username part and a realm part. The realm part identifies the home service profile server whilst the username identifies the service profile(s) on that server associated with the username. When a MIP message sent to an access router includes an NAI for which that access router has no service profile, then the access router attempts to retrieve the service profile from a service profile server identified by the NAI.

The MN can have multiple NAIs associated with one or more users of the MN, but existing MIP technology only enables a single NAI to be sent in a single MIP message. Multiple profiles can be supported in the service profile server for each NAI but only one of them can be employed by the MN on any network because, currently, only local or remote access is allowed at any given time, and multiple local or multiple remote access services for a MN are not practical because of the hand-off complexities between the MN, access router and home agents.

Alternatively, in existing non-IP cellular systems, e.g., cell phone systems, whilst local and remote access may be given to the MN (cell phone), and whilst multiple concurrent remote access sessions are possible, each distinct service is requested using non-IP signaling, is provided over a unique circuit between the basestation and the gateway router to the remote network, and the service profiles (e.g. Packet Data Profiles) associated with such multiple sessions can only be retrieved from the home network of the MN. Furthermore, in such systems network service profiles are not identified by NAIs but by Access Point Names/Numbers (APNs). Furthermore, IETF AAA signaling is normally not used to retrieve such profiles.

It would be desirable if IETF AAA, MIP and/or remote access protocol signaling could be enhanced to enable an MN to use MIP signaling to signal requests for multiple concurrent services.

In view of the above discussion, it is apparent that there is a need for improved methods and apparatus for supporting end node mobility, communication session establishment and several other operations related to establishing and maintaining communications sessions in systems which use packets to transmit data.

SUMMARY OF THE INVENTION

Figure 1:
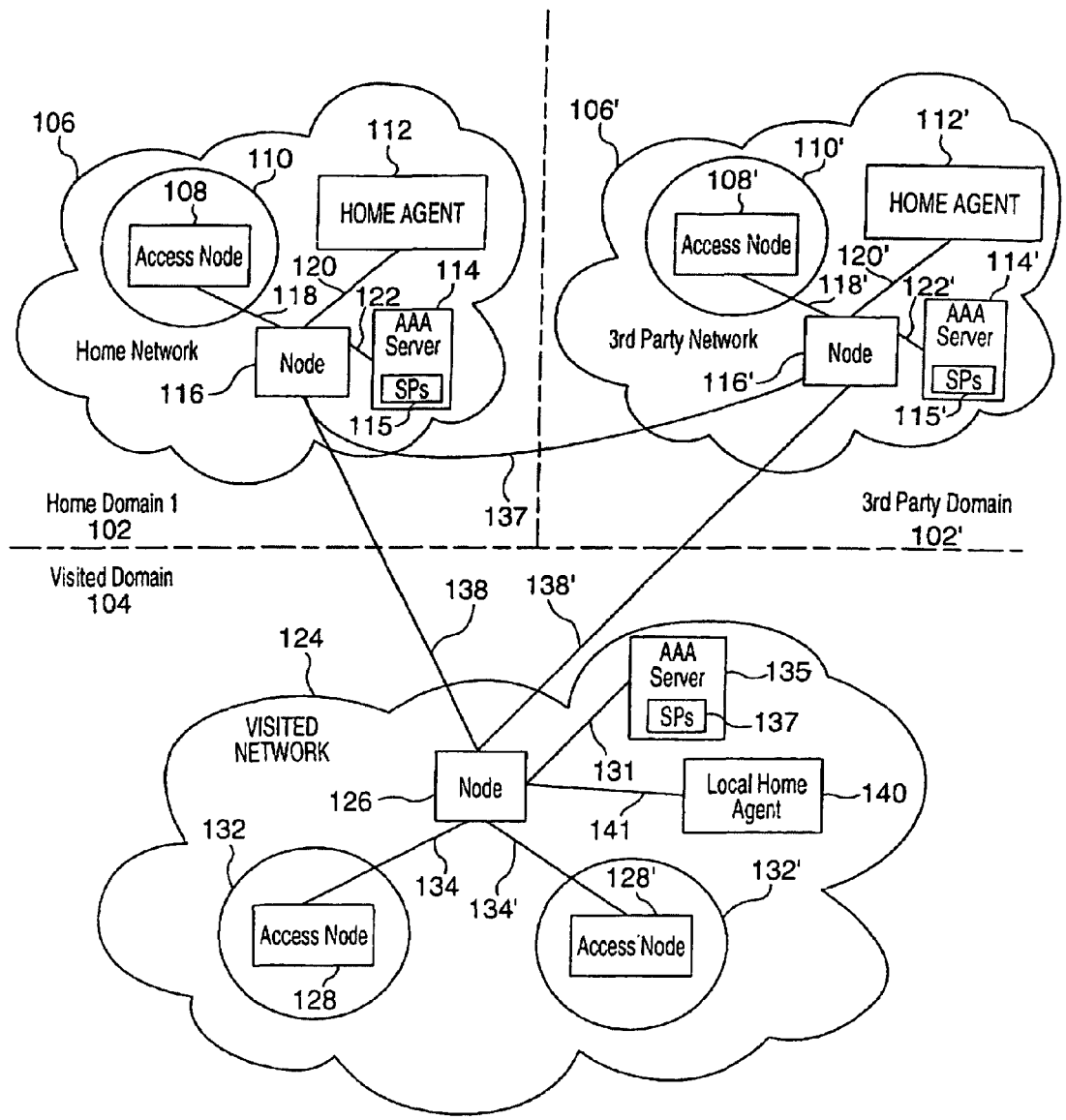
FIG. 1 illustrates an exemplary communications system including 3 domains in which the present invention can be used.

Methods and apparatus for providing an end node, e.g., a mobile node, with multiple concurrent services, corresponding to different service profiles, when outside the end node's home domain are described. The services may include a local access service and a remote access service. Various methods of the present invention involve messages and techniques associated with the retrieval of service profile information from servers, e.g., authentication, authorization and accounting servers, in one or more domains which are different from a mobile node's current domain are described.

MIP can be extended into Nested MIP to support both local and remote access connectivity, the details of which are outlined in the U.S. provisional patent application the text of which has been expressly incorporated by reference into the present application. Nested MIP implemented in accordance with one feature of the invention involves the use of novel local access MIP signals to obtain a local address from the visited network, an address that can then be used as a tunnel address for multiple remote access protocols back to a remote access gateway. The local access MIP signals maintain the reachability of the local IP address during hand-offs between access routers so that the remote access protocols that share that address as a tunnel address do not need to update the remote access gateways on each hand-off in the visited domain.

The present application addresses the need for an MN to be able to request local and/or remote access service from a local access router in such a way that multiple service profiles can be accessed to support multiple concurrent service being provided to a mobile node. In accordance the present invention information, including at least one service profile indicator, is transmitted by a mobile node to an access node. The information triggers the access node to access multiple service profiles identified by the transmitted information and to use the accessed service profiles to provide multiple concurrent services to the mobile node. In accordance with the present invention, the transmitted information includes at least one mobile IP (MIP) message that includes at least one service profile indicator. The service profile indicator corresponds to at least one service profile to be accessed. In some embodiments, multiple service profile indicators are transmitted in a single mobile IP message in which case, at least one service profile corresponding to each of the multiple service profile indicators is to be accessed.

In addition to the service profile indicator, one or more associated service selector flags may be included with the transmitted information. The selector flags are used to identify different ones of the identified service profiles associated with the particular service profile indicator. One or more service profiles may be set to correspond to a service profile as a default. In such a case, each selector flag indicates at least one additional service profile to be retrieved.

The information transmitted to an access router, e.g., service profile indicators and/or selectors, are normally communicated by the access router receiving the information via one or more messages, to one or more access routers which operate to retrieve and return the service profiles corresponding to the received information. The information may be transmitted in one message which results in the retrieval, loading and accessing of multiple service profiles at the access node as part of providing multiple concurrent services to the mobile node transmitting the information. Alternatively, the information used to access service profiles may be transmitted over a period of time, e.g., as multiple messages. In such an embodiment, the first message normally used to obtain access to a local service is normally transmitted as a mobile IP message. Subsequent messages, e.g., including one or more additional service profile indicators may be a mobile IP message or a message of a different type. In the case of sequential messages used to trigger access of multiple service profiles, the subsequent messages may cause additional service profiles to be retrieved and loaded into an access node which then updates the existing service profile information for the mobile node with the additional service profile information corresponding to an additional service.

In various embodiments, Network Access Identifiers (NAIs) are used as service profile indicators. In accordance with one feature of the present invention, a single NAI includes sufficient information to generate two or more distinct NAI's there from. In such a case, the single NAI may include multiple user parts and a common realm part. Alternatively, the single NAI may include part and/or multiple realm parts and a common user part. A device, e.g., access router, AAA server or other device receiving a message including the single NAI may split the single NAI into two distinct NAIs and transmit the NAIs to the appropriate AAA server's to retrieve each of the desired service profiles. The service profiles may be returned separately to the access router needing to access the profiles to provide the requested services. Alternatively, the information in each of the profiles can be combined, e.g., by the server or device which split the single NAI into two NAIs, and returned to the access router needing the profiles as a single combined service profile corresponding to the multiple requested services.

In the case where multiple NAIs are used by a mobile node to obtain access to multiple services, the first of the utilized NAIs may be considered a connectivity NAI since it is used to obtain the initial network access. Additional NAIs used to obtain additional services beyond basic access may be considered service NAIs since they are used to trigger the accessing of service profiles used to provide additional services beyond those obtained through the use of the connectivity NAI.

Various scenarios for obtaining access to service profiles depending on whether the profile is located in a home domain, visited domain, or a third party domain are possible. Numerous examples of obtaining and using service profiles given the different domain possibilities are discussed below.

A network implemented in accordance with the present invention includes one or more access nodes of the present invention through which end nodes can establish and conduct communications sessions. End nodes may be, for example, mobile devices which include or are IP hosts. Various features of the present invention facilitate an access node obtaining access to multiple service profiles quickly and efficiently. Various messaging features including the use of novel service profile indicators, e.g., a single NAI including information corresponding to two NAIs, are intended to reduce the number of signals and/or messages that need to retrieve, load and access multiple service profiles used to provide multiple concurrent services to an end node, e.g., a mobile node.

The modules included in the access node, mobile node and servers of the invention are implemented using software, hardware or a combination of software and hardware. In the case of software implementations, the modules include different instructions or sets of instructions used to control hardware, e.g., circuitry, to implement each of the different operations performed by the module. It is to be understood that the messages generated and transmitted in accordance with the present invention are stored in memory and/or buffers at various nodes as part of the generation, transmission and reception process. Accordingly, in addition to novel methods and apparatus for implementing the methods of the present invention, the present invention is also directed to a machine readable medium including one or more of the novel messages of the present invention described herein.

Numerous additional embodiments, features, and advantages of the methods and apparatus of the present invention are discussed in the detailed description that follows.

DETAILED DESCRIPTION

FIG. 1 illustrates an exemplary system 100 in which the invention is implemented. In FIG. 1, system 100 includes a home domain 1 102, a visited domain 104, and a $3^{rd}$ party domain 102'. Home domain 1 102 includes a home network 106. The home network 106 includes an access node (AN) 108 located within a cell 110, a home agent (HA) 112, and an authentication, authorization, accounting (AAA) server 114, and a network node 116. Network node 116 is coupled to AN 108, HA 112, and AAA server 114 via links 118, 120, 122, respectively. AAA server 114 provides authentication, authorization and accounting functionality.

To support authentication, the AAA server 114 stores authentication information, e.g., secrets, encryption keys, etc., which can be used to authentication one or more service users. Different authentication information may be stored for each user and/or mobile device for which the AAA server is responsible for providing authentication functionality. The authorization capabilities of the AAA server 114 are supported through the use of a set of service profiles 115. Normally, each of the plurality of service profiles corresponds to a different service to be provided. Multiple service profiles may be stored for a single user or mobile device. In the context of this invention, each service profile is associated with a distinct network service including the connectivity associated with that service and any IP addresses allocated to that service. Although shown as part of AAA server 114, service profiles 115 may, and in various are, stored in one or more separate profile servers which are accessible via the AAA server 114. The set of service profiles 115 includes a plurality of service profiles where each service profile corresponds to a different service, which may be provided, e.g., to a user or mobile device. After authentication of an entity requesting a service, the AAA server 115 accesses the set of service profiles 115. The appropriate service profile to be retrieved from the set 115 is determined using a received service profile indicator and, optionally, one or more service profile selectors. In the case where the service profile identifier uniquely identifies the service profile or profiles to be returned, the use of service profile selectors can be avoided. However, when multiple service profiles are associated with a service profile identifier and only some of the profiles are to be returned in response to an access and/or authorization request message, additional information, e.g., one or more service profile selectors are used in conjunction with a service profile identifier to identify the service profile or profiles to be returned. Thus, in the case where multiple service profiles are associated with the same service profile indicator, the profile selectors help identify the service profile or profiles to be returned. As will be discussed below, in various embodiments, Network Access Identifiers (NAIs) are used as service profile identifiers. In response to receiving an authorization message including multiple NAI's, or information from which multiple NAI's can be derived in a predetermined manner, the AAA server 115 will normally access and return the service profiles corresponding to each of the NAI's included in, or represented by information included in, a received authorization message. Similarly, in the case where a received authorization request message includes a single service profile identifier, e.g., NAI, having multiple service profile selectors associated therewith in the authorization request message, the AAA server 114 will normally respond by providing each of the service profiles which are identified by the combination of the included NAI and service profile selector.

Accounting functions are provided by AAA server 114 following authorization of a service, in conjunction with accounting records generated in the access node 108 and returned to the AAA server 114. Accounting functions include tracking of such things as service usage information, resource usage, time of usage, etc at the access router, so that the service can be properly billed. Accounting information may be stored in the same or, more commonly, in a different database from the service profile information and the service profile typically includes information on the accounting records to be generated by an access router 108, and the location of the accounting server that will receive such accounting records. Service profiles and accounting information can be stored inside AAA 114 or in one or more databases, e.g., profile servers, to which the AAA server 114 has access.

The visited domain 104 includes a visited network 124. The $3^{rd}$ party domain 102' includes third party network 106'. Elements within the $3^{rd}$ party domain 106' are similar or to equivalent to the elements within the home domain 102 and are represented in FIG. 1 with the same numbering designation followed by '.

Visited network 124 includes a network node 126, a plurality of access nodes (ANs) 128, 128', and an authentication, authorization, accounting (AAA) node 135. Each access node 128, 128' is located within a cell 132, 132' respectively. Each communication cell 132, 132' represents the coverage area of corresponding access node 128, 128', respectively. Network node 126 is coupled to AN 128, AN 128', AAA server 135, and local home agent 140 via links 134, 134', 131 and 141, respectively. Network node 126 is further coupled to node 116 of the home domain 102 by link 138 and node 116' of the $3^{rd}$. party domain 102' by link 138'. Thus, link 138 couples home domain 1 102 to visited domain 104 while link 138' couples the $3^{rd}$ party domain 102' to visited domain 104. Link 137 couples network node 116 to network node 116', thereby connecting home domain 1 102 to $3^{rd}$ party domain 102'. In this manner, the nodes of the three domains 102, 102', 104 are interconnected.

AAA servers 114, 114' and 135 in each of the home domain 102, $3^{rd}$ party domain 102' and visited domain 104 may be implemented to provide the same or similar functionality. In this way, the visited network may alternatively be the home network for one MNs, the home network may be the third party network for said MN, and the third party network may be the visited network for said MN.

Figure 2:
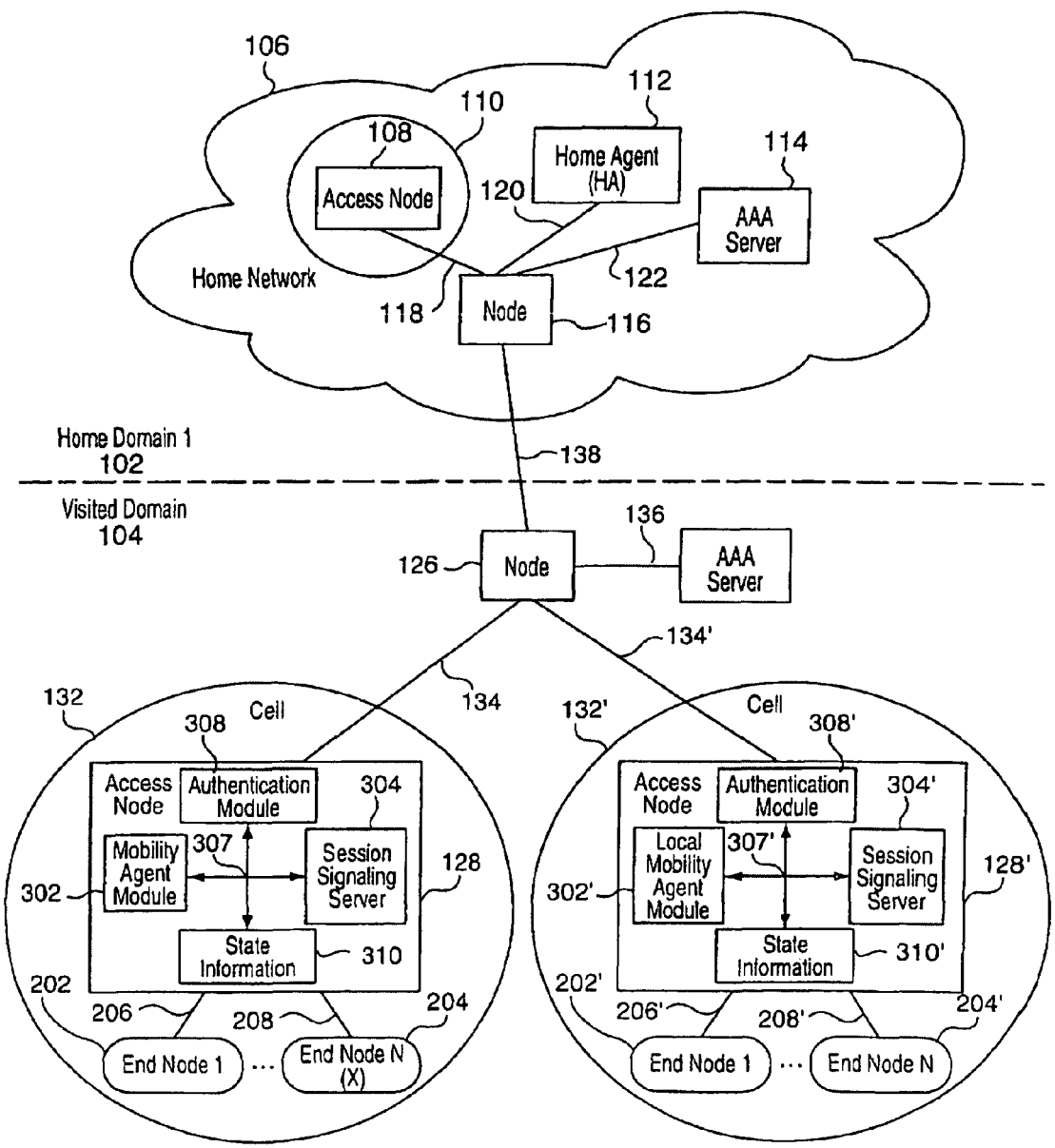
FIG. 2 is a more detailed illustration which shows two of the domains shown in FIG. 1.

FIG. 2 further illustrates the home and visited domains 102, 104 shown in FIG. 1. The home domain 102 is the same as shown in FIG. 1 and shall not be described further. FIG. 2 includes additional detail with regard to cells 132, 132'. The same physical and functional elements are depicted in each of the communication cells 132, 132', thus the following description of the elements in the cell 132 surrounding access node 128 is equally applicable to each of the cells 132, 132'. As shown in FIG. 2, each access node 128, 128' is coupled to a plurality of end nodes (202, 204), (202', 204') e.g., by links (206, 208), (206', 208') respectively. The communication links may be wireless links, e.g., radio links. Access nodes 128, 128' serve as the point of network attachment for the end nodes connected thereto. Access node 128 includes a mobility agent module 302, a session signaling server module 304, an authentication module 308, and state information 310. A set of arrows 307 is used to represent the exchange of data, information, and signals between the depicted elements when they are executed. Connectivity between access node 128 and other network nodes is shown and is subsequently further described. Access nodes 128, 128' may be implemented as, e.g., base stations while end nodes (202, 204), (202', 204') may be implemented as, e.g., mobile devices via access nodes 128, 128', the end nodes coupled thereto can gain access to services corresponding to any of the three domains 102, 102', 104. In addition, the MNs can move between access routers 128 and 128', and to other access routers in other domains such as the access nodes 108 in the home domain 1 102.

Figure 3:
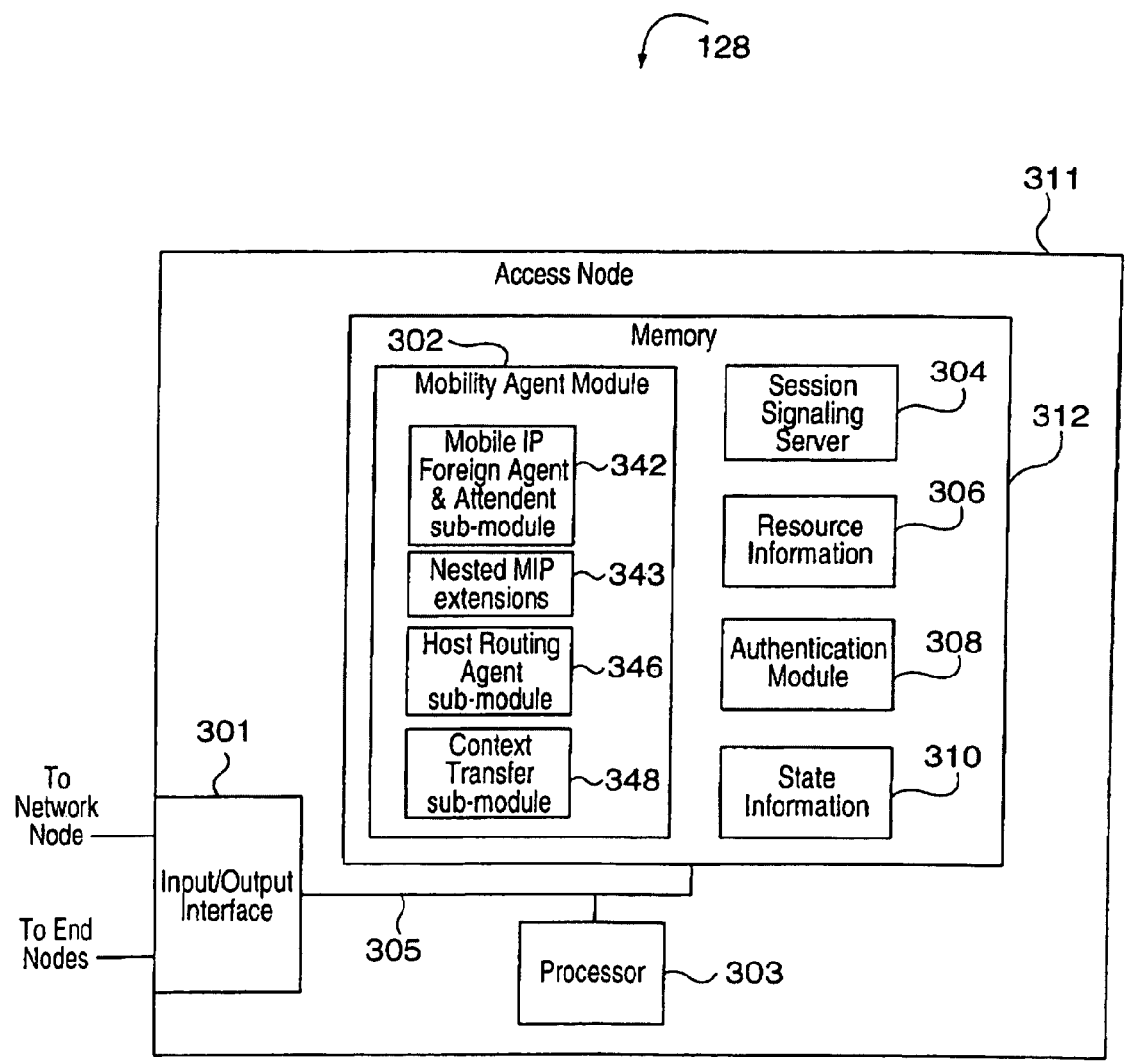
FIG. 3 illustrates an exemplary access node implemented in accordance with the invention.

FIG. 3 illustrates an exemplary access node 128 implemented in accordance with the present invention. The access node 128 illustrated in FIG. 3 may be used as an access node of the system shown in FIG. 1. In the FIG. 3 embodiment, the access node 128 includes an input/output interface 301, a processor 303 and memory 312, coupled together by bus 305. The elements 301, 303, 312, 305 of access node 128 are located inside a housing 311, e.g., a case of plastic and/or metal, represented by the rectangle surrounding the node's internal elements 301, 303, 312, 305. Accordingly, via bus 305 the various components of the access node 128 can exchange information, signals and data. The input/output interface 301 provides a mechanism by which the internal components of the access node 128 can send and receive signals to/from external devices and network nodes. The input/output interface 301 includes, e.g., a receiver circuit and transmitter circuit used for coupling the node 128 to other network nodes, e.g., via fiber optic lines, and to end nodes, e.g., via wireless communications channels.

The processor 303 under control of various modules, e.g., routines, included in memory 312 controls operation of the access node 128 to perform various signaling, session admission, resource allocation, authentication, and other operations as will be discussed below. The modules included in memory 312 are executed on startup or as called by other modules. Modules may exchange data, information, and signals when executed. Modules may also share data and information when executed. In the FIG. 3 embodiment, the memory 312 of access node 128 of the present invention includes a mobility agent module 302, a session signaling server module 304 and an authentication module 308 as well as resource information 306 and state information 310.

Resource information 306 includes, e.g., parameters, resource limits both internal to the access node 128 as well as on its interfaces 301, indication and/or accounting of active sessions and/or used resources and/or available resources both internal to the access node 128 as well as on its interfaces 301. State information 310 includes, e.g., parameters, communication session and/or end node status information, security information, and/or other information relating to end node interaction and/or communication with an access node and/or another device. State information 310 may include one or more user service profiles retrieved and loaded into memory in accordance with the methods of the present invention. The loaded user service profiles are accessed to provide services to a user. In some cases multiple services are provided concurrently to a single user or mobile device using, e.g., multiple service profiles or a composite profile generates from multiple service profiles.

The session signaling server module 304 allows the access node 128 to support session initiation operations, e.g., processing of received signals or messages used for the establishment of a data communication sessions and sending of subsequent signals or messaging as required. The session signaling server module 304 also supports session maintenance and termination services. During a session initiation operation as part of an admission control step the session signaling server may take into account and keep track of available resources. Thus, the session signaling server may access and update the resource information 306, which is kept in memory 312, e.g., information on available remaining bandwidth not allocated to active sessions.

The mobility agent module 302 allows the access node 128 to support end node mobility and connectivity management services. Thus, the access node 128 is capable of providing node mobility, session establishment, and session maintenance services to connected end nodes. The mobility agent module 302 may be implemented in a plurality of ways. In the FIG. 3 embodiment it is implemented with a collection of sub-modules. As illustrated, the mobility agent module 302 includes sub-modules 342, 343, 346, and 348 which operate as a Mobile IP Foreign Agent and Attendant, Nested MIP extensions, a Host Routing Agent, and a context transfer element respectively. The context transfer module 348 is responsible for the transfer of state information corresponding to an end node, e.g., as part of a handoff operation. By including sub-modules 342, 343, 346, and 348 the mobility agent module 302 is capable of handling handoffs, end node mobility and multiple versions of Mobile IP signaling including Mobile IPv4 and Mobile IPv6 signaling. The Nested MIP extension module 343 enables the MN to firstly acquire a local home agent in the visited network 124, and a local IP address from that local home agent as a MIP Home Address for the local access service. Module 343 then preserves the reachability of that local IP address as the MN moves within a portion of the visited network. Module 343 further enables the MN to employ a second layer of MIP signaling to configure any number of remote access tunnels with remote networks such as the third party network 106', and to have the initialization of that tunnel be first checked against the authorization state for the MN via the Authentication Module. Further, the module 343 informs the MN when the local IP address is to become unreachable due to a change in local home agent so that the module 342 can obtain a replacement local IP address from a new local home agent, and so that the MN can then update the tunnel address for its remote access sessions. Finally, the Nested MIP extensions in module 343 enables one or more MIP signals to carry requests for specific services, and one or more novel service profile indicators and that can be used by the authentication module to acquire the service profiles for those services, and to enable the MN to concurrently utilize more than one such service at the access node 128.

As part of a handoff operation executed by the mobility agent module 302, when an end node changes its point of connection from the access node 128 to another access node, or vice versa, the context transfer sub-module 348 performs an operation to support the transfer of state information 310 regarding the end node from one access node to the next. The state information 310 that is transferred includes state information provided by other modules in memory 312. In particular, the state information 310 includes data communication session state and session establishment state provided by the session signaling server module 304, as well as authentication state and other security related state provided by the authentication module 308. In the present context, "state" is used to broadly refer to information about a state, e.g., of a device, node, or communications session. In alternative embodiments of the invention the mobility agent module 302 may also include additional sub-modules to support a number of mobility related functions that improve the performance of handoff and minimize service disruption. In another alternative embodiment equivalent context transfer functionality may be implemented as a separate module in memory 312, as opposed to a sub-module of the mobility agent module 302.

The authentication module 308 included in memory 312 of the access node 128 is capable of authenticating messages and signals from other network nodes and end nodes connecting to the access node 128 via the input/output interface 301. The authentication module 308 also provides authentication services to other modules and sub-modules included in the memory 312 of the access node 128. Thus, the authentication module 308 can check the validity of messages and signals received by other modules and sub-modules in memory 312, e.g., the session signaling server module 304. Authentication module functionality can be incorporated directly into other modules or sub-modules instead as a separate module 308.

While shown as software module in the FIG. 3 implementation, each of the modules 302, 304, 308, and sub-modules included therein, can be implemented using hardware, software or a combination of software and hardware. For purposes of the invention described herein, references to modules or sub-modules are to be understood as software, hardware or a combination of software and hardware that performs the functions of the described module or sub-module.

In accordance with one particular embodiment of the present invention, the session signaling server module 304 is a SIP (Session Initiation Protocol) server. In a particular embodiment, the access node 128 is implemented as a wireless access router that supports forwarding of IP (Internet Protocol) datagrams. In such an implementation input/output interface 301 includes circuitry, e.g., receiver/transmitter circuitry, that allows end nodes to connect to the access node 128 using wireless communications technology, e.g., via wireless communications channels. In one such implementation the coverage area of the access node is called a communication "cell". In alternative embodiments, the session signaling server module 304 sends, receives and processes signal based on other protocols such as the Resource Reservation Protocol (RSVP). In some embodiments the session signaling server module 304 supports both SIP and RSVP signaling. In some embodiments the input/output interface 301 includes circuitry that allows end nodes to connect to it via wired, wireless or a combination of wired and wireless communications technologies.

Figure 4:
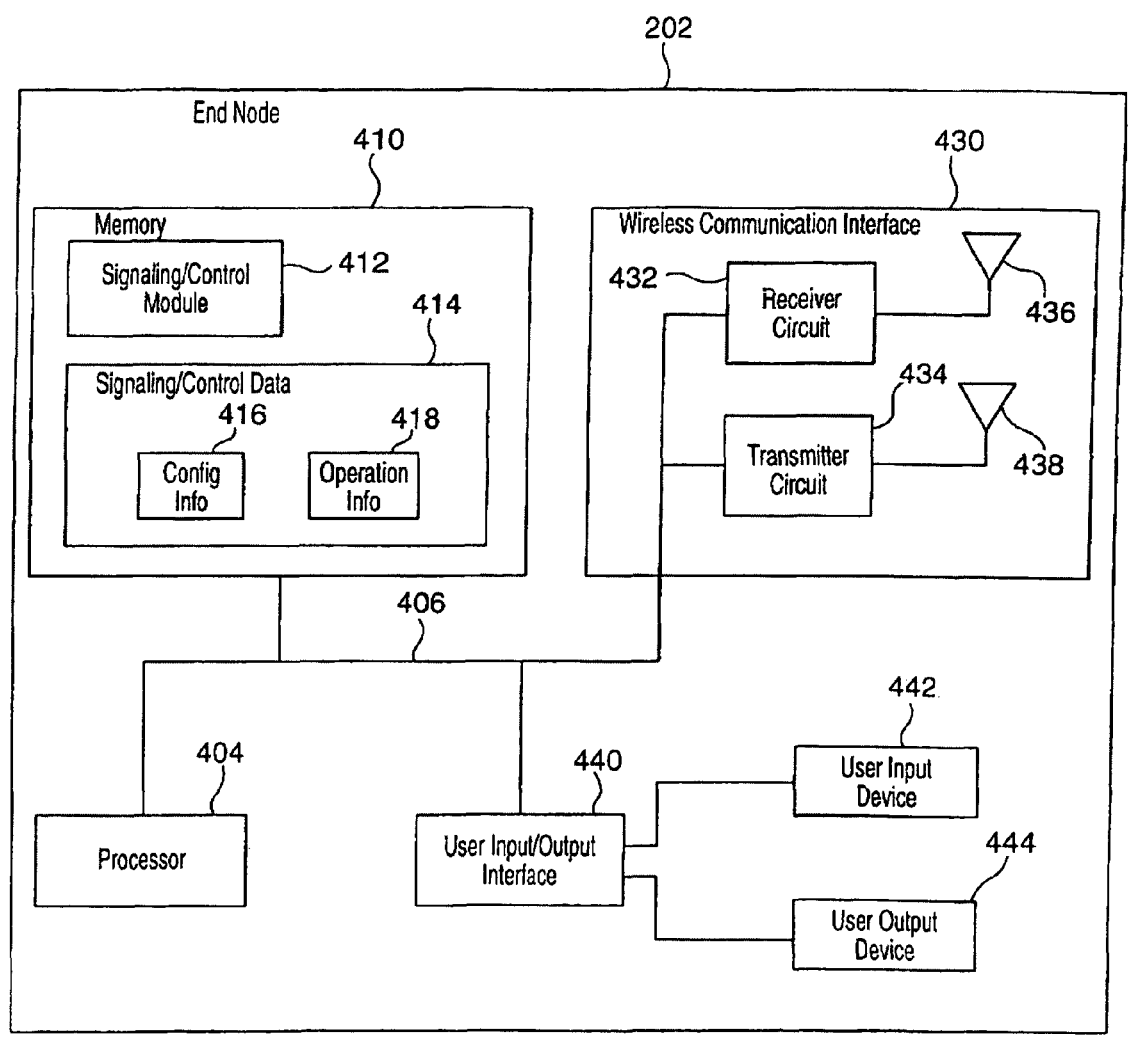
FIG. 4 illustrates an exemplary end node implemented in accordance with the invention.

FIG. 4 illustrates an exemplary end node, e.g., mobile node 202, implemented in accordance with an exemplary embodiment of the invention. The exemplary end node 202, is a detailed representation of an apparatus that may be used as any one of the end nodes 202, 204, 202', 204', depicted in FIG. 2. In the FIG. 4 embodiment, the end node 202 includes a processor 404, a wireless communication interface 430, a user input/output interface 440 and memory 410 coupled together by bus 406. Accordingly, via bus 406 the various components of the end node 202 can exchange information, signals and data. The components 404, 406, 410, 430, 440 of the end node 202 are located inside a housing represented by the outermost box shown in FIG. 4.

The wireless communication interface 430 provides a mechanism by which the internal components of the end node 202 can send and receive signals to/from external devices and network nodes, e.g., access nodes. The wireless communication interface 430 includes, e.g., a receiver circuit 432 with a corresponding receiving antenna 436 and a transmitter circuit 434 with a corresponding transmitting antenna 438 used for coupling the end node 202 to other network nodes, e.g., via wireless communications channels.

The exemplary end node 202 also includes a user input device 442, e.g., keypad, and a user output device 444, e.g., display, which are coupled to bus 406 via the user input/output interface 440. Thus, user input/output devices 442, 444 can exchange information, signals and data with other components of the end node 202 via user input/output interface 440 and bus 406. The user input/output interface 440 and associated devices 442, 444 provide a mechanism by which a user can operate the end node 202 to accomplish various tasks. In particular, the user input device 442 and user output device 444 provide the functionality that allows a user to control the end node 202 and applications, e.g., modules, programs, routines and/or functions, that execute in the memory 410 of the end node 202.

The processor 404 under control of various modules, e.g., routines, included in memory 410 controls operation of the end node 202 to perform various signaling and processing as discussed below. The modules included in memory 410 are executed on startup or as called by other modules. Modules may exchange data, information, and signals when executed. Modules may also share data and information when executed. In the FIG. 4 embodiment, the memory 410 of end node 202 of the present invention includes a signaling/control module 412 and signaling/control data 414.

The signaling/control module 412 controls processing relating to receiving and sending signals, e.g., messages, for management of state information storage, retrieval, and processing. Signaling/control data 414 includes state information, e.g., parameters, status and/or other information relating to operation of the end node. In particular, the signaling/control data 214 may include configuration information 416, e.g., end node identification information, and operational information 418, e.g., information about current processing state, status of pending responses, etc. The module 412 may access and/or modify the data 414, e.g., update the configuration information 416 and/or the operational information 418.

The signaling/control module 412 includes remote access software which can be used to signal a request for a remote access tunnel to be set-up to a remote access gateway in a network 106, 106' or even 124. The remote access software uses the local IP address received as part of the MIP mobility module, as the MN tunnel address, and the remote access software is restarted for every new local IP address allocated to the MN. The remote access tunnel can be based on MIP, IPSEC or L2TP software for example. The MN 202 does not need to know the address of the remote access gateway in advance of initiating a MIP based remote access request because the AAA system can dynamically assigned a remote access gateway address via the access router.

FIGS. 5-11 are simplified representations of the system shown if FIG. 1 with various exemplary signal flows shown.

Figure 5:
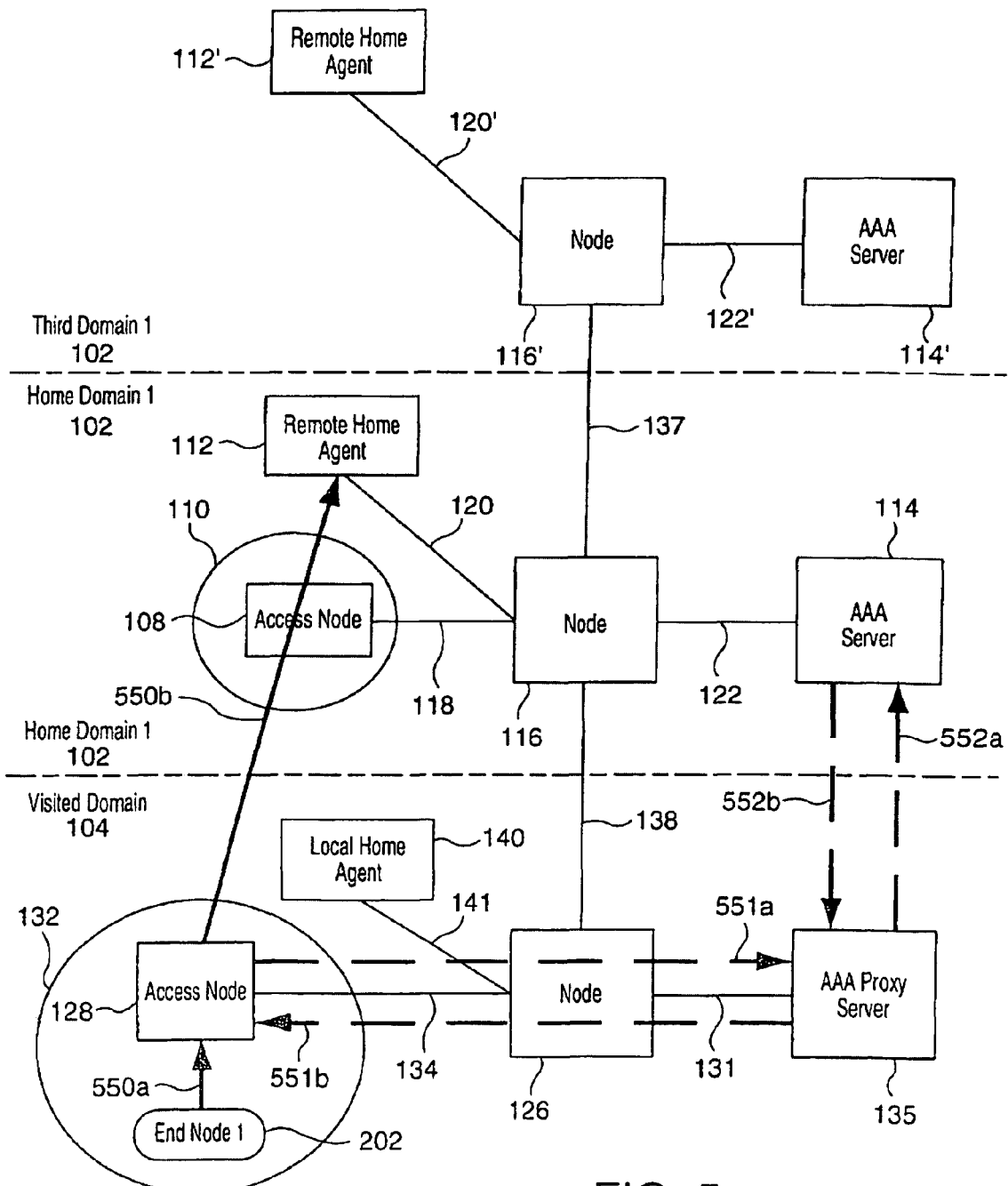
FIG. 5 illustrates an exemplary access signaling process used by an end node to gain access to local and remote access services.

FIG. 5 shows an exemplary sequence of signals used to enable an end node 202, which may be for example a mobile node (MN) 202, to access a MN remote access only service profile whilst in the visited network 124. A MIP remote access message 550 is transmitted towards access node 128 to request access to a remote access service while in the visited domain 104. Access node 128 may be, for example, an access router that is used to support the requested service profile. The message 550 is directed towards the Remote Home Agent 112 of the MN 202, in home domain 1 102 but is first sent to the access router 128 as message 550a and is then sent on to the remote home agent 112 as message 550b. Message 550 includes a Network Access Identifier (NAI) having a user part and a realm part. The realm part of the NAI of the MN 202 in message 550a identifies the home AAA server 114 of the MN 202, in home domain 102. This causes the access router 128 to send an authentication and authorization request (AAR) message 551a towards the visited AAA server 135, which generates and sends a proxy AAR message 552a towards the home AAA server 114. In AAR message 552a, a username part of an NAI included therein identifies the MN (host OS and/or user of host OS) user service profile. The identified profile is returned in AAR messages 552b from home AAA server 114 to visited AAA server 135 and then from visited AAA server 135 to access router 128 in message 551b. The combination of messages received by access node 128 authenticates and authorizes the use by the MN 202 of a single remote access service in the visited network 124, that is controlled by the single MN remote access service profile returned by the home AAA server 114 to access node 128. The returned MN profile is stored and accessed by node 128 in order to provide end node 202 with the single authorized service.

Figure 6:
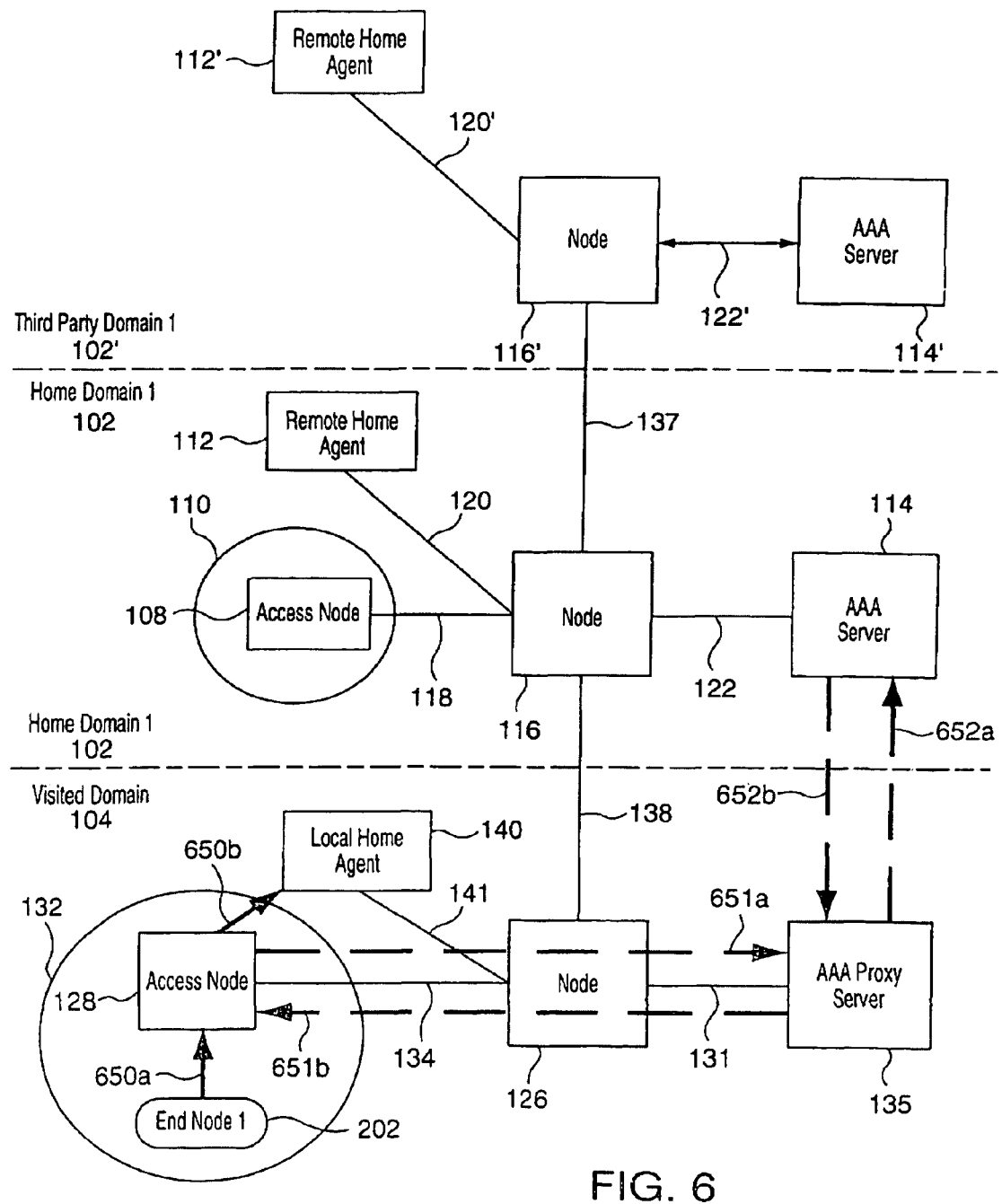
FIGS. 6-11 show various examples of signaling flows used to obtain access to multiple services, which are utilized concurrently, in accordance with the invention.

FIG. 6 illustrates an exemplary embodiment of the invention whereby the roaming MN, end node 1 202 in this example, transmits information, used to obtain access to service profiles, towards a local home agent 140 in the visited network 124, via the access router 128. Access router 128 receives message 650a and forwards the message as message 650b to the local home agent 140. In this example, the information is communicated using MIP signaling and is included in a single MIP messages 650a. Messages 650a and 650b include user service profile identification information, e.g., at least one service profile indicator such as an NAI. Receipt of message 650a by the access router triggers request AAR message 651a from access router 128 toward visited AAA server 135. Message 651a includes the service profile indicator information obtained from message 650a. The receipt of message 651a by AAA server 135 triggers the AAA server to transmit AAR message 652a, which includes the service profile identification information, communicated by message 651a, toward home AAA server 114. The AAA server 114 returns the service profiles corresponding to the received service profile identification information to access node 128 via visited domain server 135 using messages 652b and 651b.

The access node 128 loads the returned profile information into memory and uses it to provide the requested service(s). The first MN service profile includes a local access MN service profile to control the local access service provided to the visiting MN 202 in the visited domain 104 employing an address from the local home agent 140 as the application address.

Message 650a can indicate, e.g., by including a second service profile indicator, in accordance with the invention, that the MN 202 wishes to employ a second user profile to control its remote access service. In such a case, AAR messages 652b, 651b will return this profile from the home AAA server 114, in addition to returning the local access profile. The remote access MN service profile is used by access node 128 to control usage of the visited network 124 by application flows using a remote access address from the remote home agent 112 as a source/destination address. The returned remote access user profile, in some embodiments, includes the remote access address and/or the address of the allowed remote home agents 112 for end node 202.

In some implementations the MN NAI in message 650a corresponds to both a local and a remote access service profile. In such an implementation, inclusion of the MN NAI in messages 650a, 651a, 652a, is used to implicitly indicate that both the local and the remote access service profile should be returned from the home AAA server 114 to the access router 128 in the visited domain 104. When the MN 202 has multiple remote access services available from remote home agents 112 and 112' in home domain 102 and third party domain 102' then remote access profiles can and in various embodiments are, requested in AAR messages 651a and 652a and returned in AAR messages 652b and 651b to the access router 128, e.g., when the MN service profile for the third party remote access service is stored in the home AAA server 114.

The service profile indicator, e.g., MN NAI in message 650a can be accompanied by one or more profile selectors which indicate which of a plurality of MN service profiles associated with the MN NAI and stored in the home AAA server 114, are to be requested in AAR messages 651a and 652a and should be returned in the AAR messages 652b, and 651b. Consider the following example, where joe@networkA is the NAI and a local access service flag from the MIP local access message 650a is the profile selector associated with the NAI included in the messages 651a and 652a.

A profile selector can be, without loss of generality, e.g., a MIP signaling flag or a MIP extension in the MIP message 650a. A MIP signaling flag could be used for each type of requested service to indicate the required profile, with multiple such flags included in said message 650a. These flags could alternatively be included in a MIP extension. The MIP extension could include additional remote access service NAI(s). The remote access service NAI(s) may have the same realm (indicating home AAA server 114) such that the username part of said additional NAI indicates one or more additional user service profiles to the local access MN service profile. Note that these two NAIs could be sent by the MN 202 in message 650a in a single MIP NAI extension, formatted as a single NAI but including one realm part and two different username parts or, alternatively as a single NAI that includes one username and two different realm parts. An example of a single NAI of the present invention with two different user parts and one realm part is as follows: _joeESCbob@networkA where the ESCape character delineates the two usernames. An example of a single NAI of the present invention with one user name and two realm parts is as follows: joeESC@networkA@networkB where the ESCape character indicates a first realm nested within a second realm. Combinations of selectors and NAIs can also be used to request multiple profiles in a controlled way from the home AAA server 114. This functionality enables the MN to request access to a subset of multiple available services corresponding to different service profiles in a single message and be given or refused access to said services corresponding by the home AAA server 114.

Figure 7:
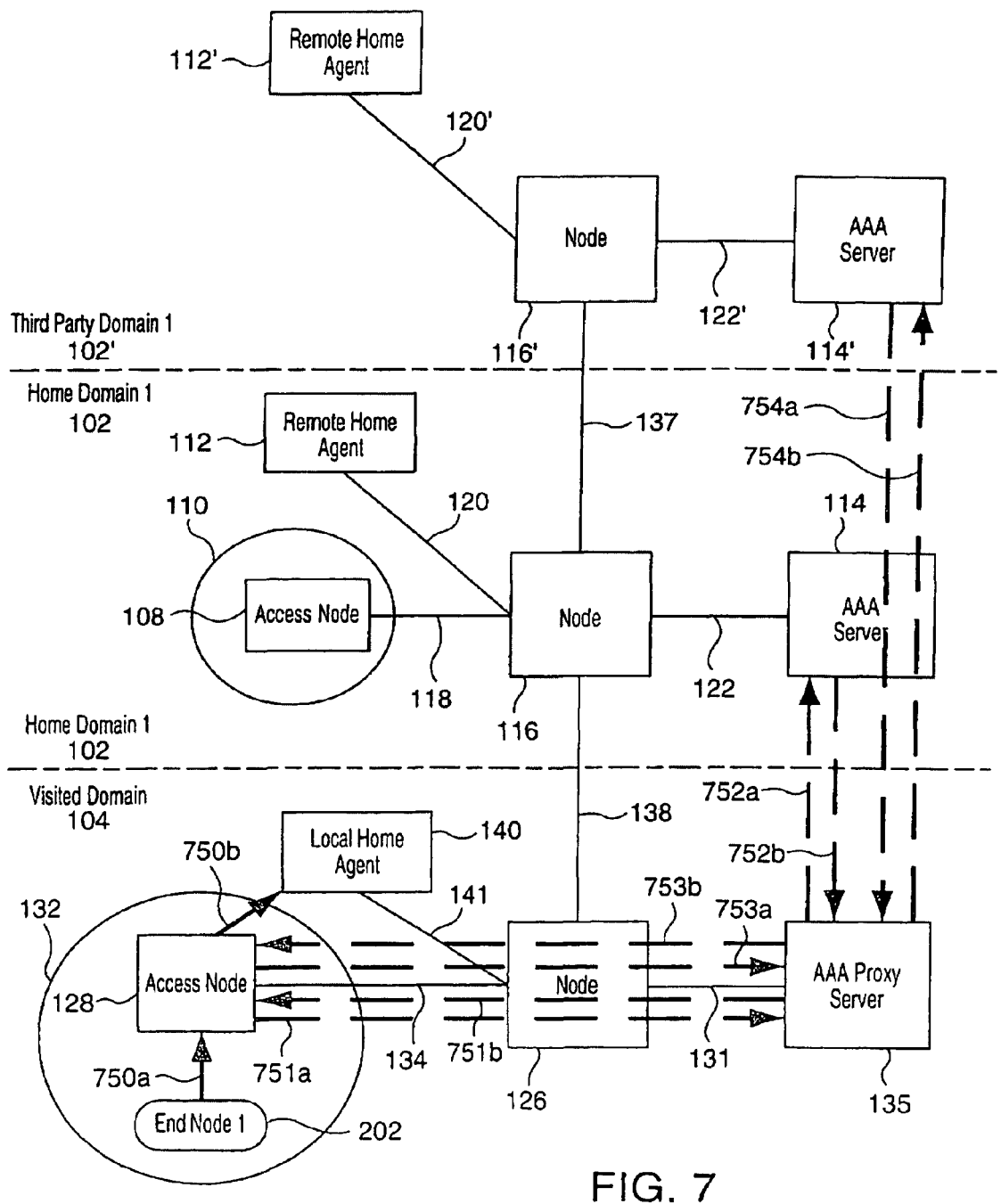

FIG. 7 shows an alternative exemplary embodiment of the invention whereby the MN 202 requests multiple MN service profiles as part of the MIP local access message 750 but at least one of the remote access profiles does not reside in the home AAA server 114 of the MN 202, said server being identified by the realm part of a first NAI in the message 750. The message 750 includes a second NAI with a different realm part identifying another AAA server 114' in the third party domain, known as the third party AAA server. The access router 128 detects the two NAIs with different realms and responds by generating and transmitting two separate AAR messages 751a and 753a, each of which correspond to one NAI. The two messages are sent to, and proxied by, the visited AAA server 135. In response to receiving messages 751a and 753a, AAA server 135 transmits AAR messages 752a and 754a, to the home AAA server 114 and the third party AAA server 114', respectively. In response to receiving message 752a, the home AAA server 114 returns the local access profile to the visited AAA server 135 via message 752b. Subsequently the local access profile is returned via AAR message 751b from the visited AAA server 135 to the Access router 128 along with any requested remote access service profiles that also reside in home AAA server 114.

The third party AAA server 114' returns at least one additional remote access profile to the access node 128 by way of return message 754b which is supplied to the visited AAA server 135. The server 135 forwards the information received in message 754b, to access router 128, in AAR message 753b. The MN service profiles returned in messages 751b and 753b are installed, e.g., loaded into the memory of access router 128 and then accessed. Accessing of the loaded service profiles may be, e.g., as part of a service control process, performed by the access node 128 to control consumption of visited network resources by the MN 202 while providing at least a portion of the services corresponding to the returned service profiles. For remote access service consumption, the MN issues a remote access service request which then matches a remote access service profile now residing in access node 128.

Figure 8:
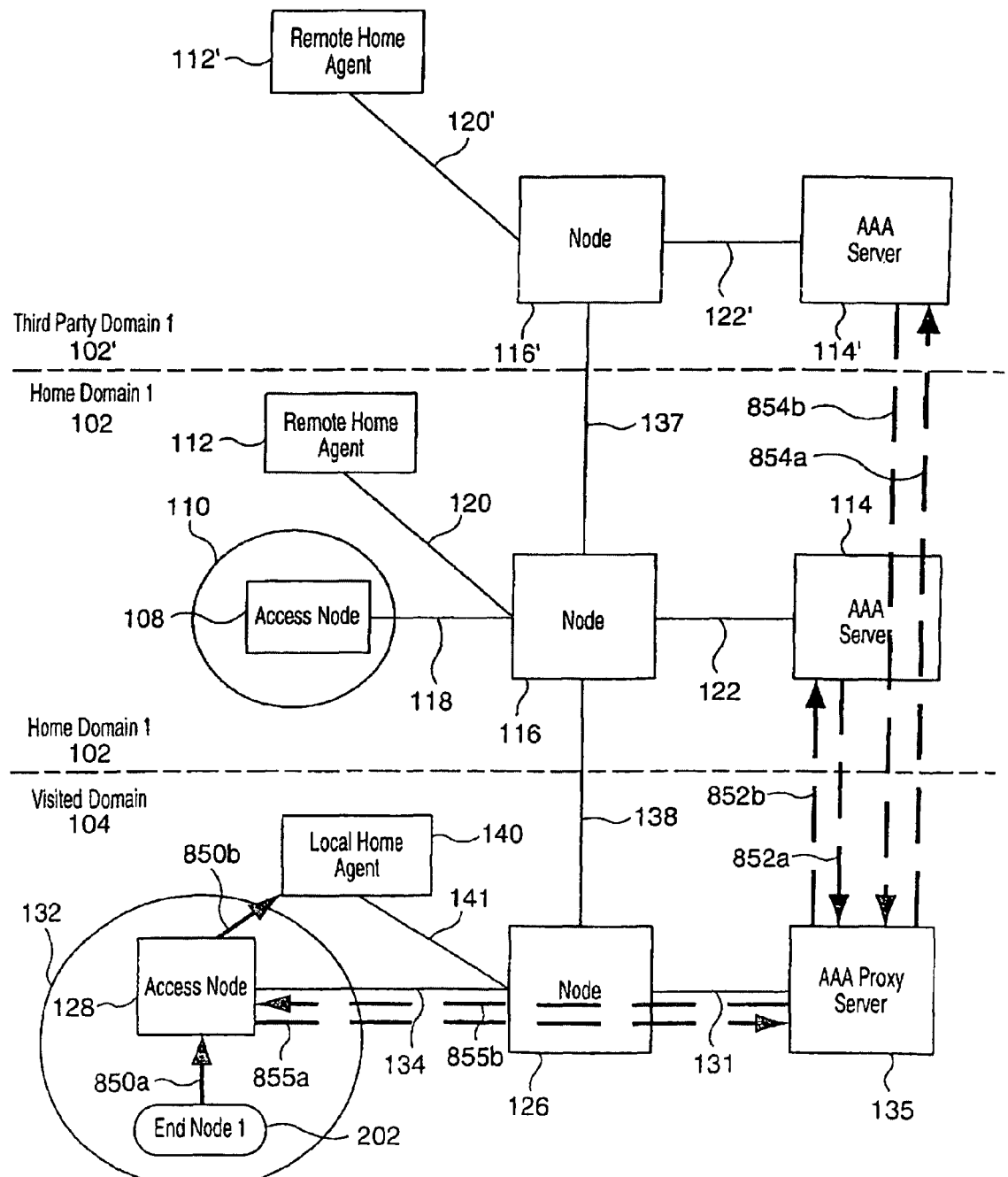

FIG. 8 shows another embodiment of the invention, which is a variation of the invention as described in FIG. 7, whereby the access router 128 issues a single AAR message 855 to the visited AAA server 135, in response to the message 850a from the MN 202. In the FIG. 8 embodiment messages 850 and 855a each include two NAIs. Each NAI includes a user part and a realm part. The two included NAI's have different realm parts, which identify at least two different user service profiles, e.g., at least one per NAI. The visited AAA server 135 detects the two NAIs and generates from the single AAR message 855a, two AAR messages 852a and 854a. Messages 852a and 854a are directed to the home and third party AAA servers 114, 114', respectively. The NAI and any profile selectors included in message 854a is used by the third party AAA server 114' to retrieve MN profile information which is then returned to visited AAA server 135 in message 854b. Home domain AAA server 114 responds to message 852a by using the NAI and any selectors included in message 852a to retrieve a service profile and to return it to the visited domain server 135 via message 852b.

The visited AAA server 135 then merges the profile information included in messages 852b and 854b into a single message 855b which is transmitted back to the access router 128. The message 855b includes the retrieved user service profiles along with any available error information.

In some embodiments of the invention, two NAIs are sent by the MN 202 in a message 750 or 850 in a single MIP NAI extension. In one such embodiment the two NAI's are formatted as a single NAI including at least two different realms and one or two usernames. An example of such an NAI is joeESCjoe@networkAESC@networkB where the ESCape character is used concatenate the two usernames and two@realms into each of a single username field and a single realm field, and hence to instruct the visited AAA server 135 to recreate the two original NAIs.

FIGS. 7 and 8 also illustrate embodiments of the invention in which a single remote access profile may be comprised of information stored in two different AAA servers, such as the home AAA server 114 and the third party AAA server 114'. As shown in FIG. 7, the access router 128 combines the two parts of the profile into a single user service profile, whereas as shown in FIG. 8 either the visited AAA server 135 or the access router 128 combines the two profiles.

Figure 9:
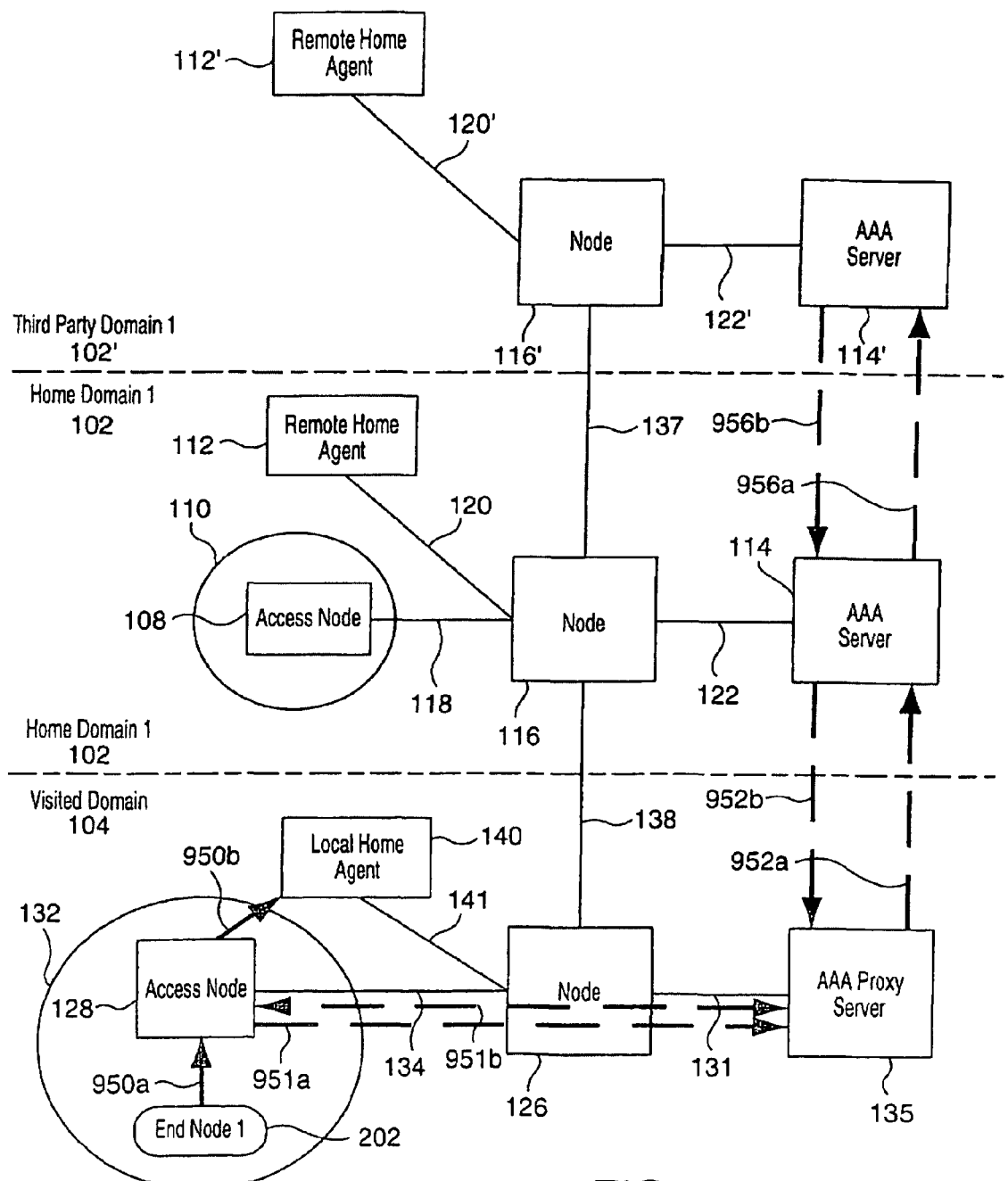

FIG. 9 shows a further embodiment of the invention. In FIG. 9 the message 950 includes a single MIP NAI extension that includes two NAIs and at least one username. The format this time would be joeESC@networkA@networkB which indicates that the profile for joe is at networkA but is accessible via networkB. This is carried in message 951a from the access router 128 to the visited AAA server 135 which proxies the information to the home AAA server 114, in message 952a, using the first of the realm fields in the NAI extension (networkB). The home AAA server 114 can then retrieve any profiles associated with the first username plus first realm.

The home AAA server 114 then removes networkB and the ESC character from the NAI (leaving joe@networkA which is a standard NAI) and further proxies the request into message 956a to the third party AAA server 114' using the second realm in the NAI extension. The user profiles associated with the username(s) in that realm, and any included selectors are then retrieved from the third party AAA server 114' and returned to the access router 128 via the home AAA server 114 and the visited AAA server 135 via AAR messages 956b, 952b, and 951b respectively. The home AAA server combines the profiles returned from the third party AAA server 114' with its own profiles as part of this return process. This enables the third party AAA server 114' to hold the MN 202 local and remote access server profiles for the MN 202 and use the AAA connectivity and security associations of the home AAA server 114 to deliver those MN profiles to a large number of visited domains. It also enables the local access profile and the remote access profile to be distributed across the home AAA server 114 and the third party AAA server 114', and be retrieved using a single message sequence.

Figure 10:
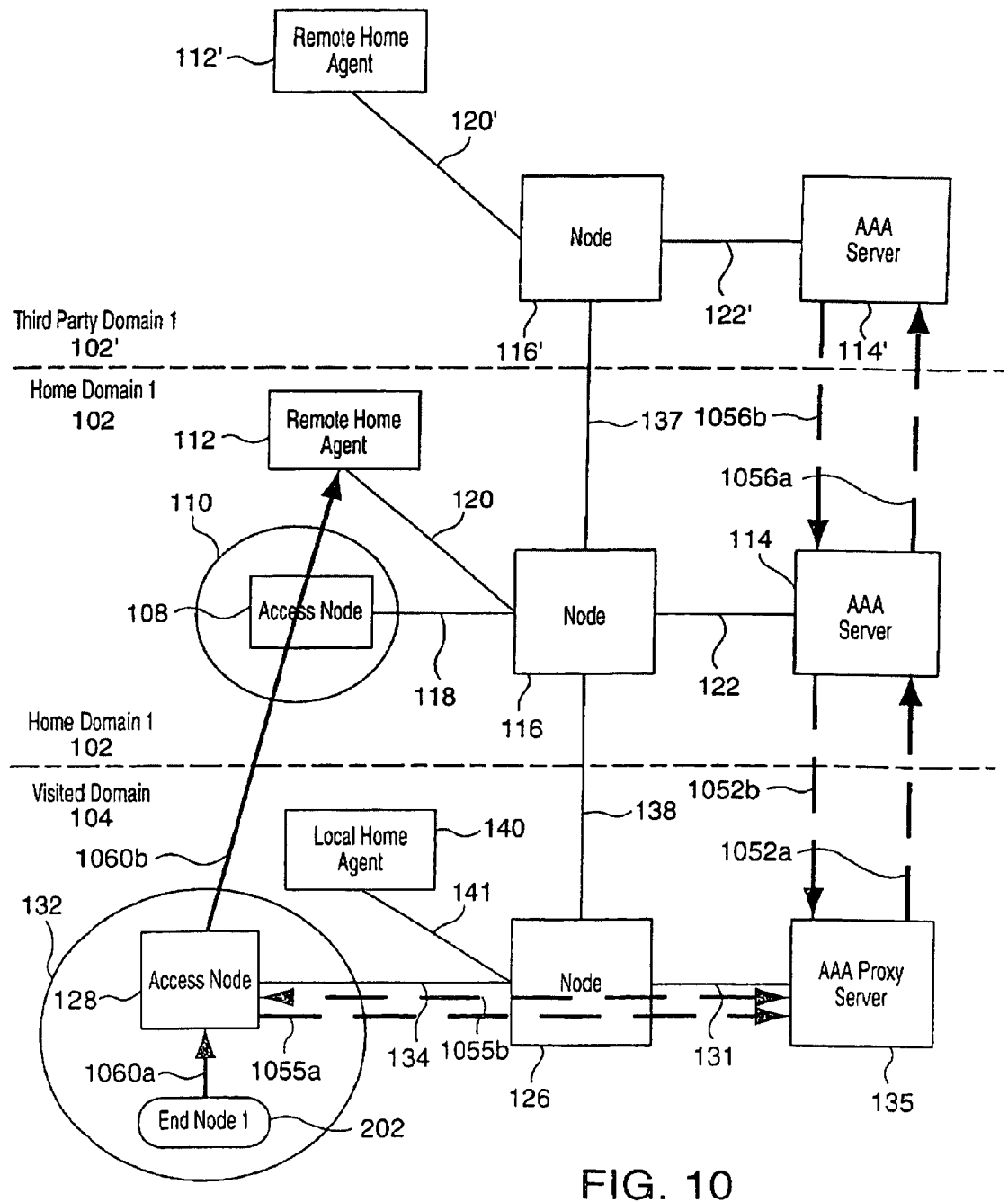

FIG. 10 shows a further embodiment of the invention whereby the message 550 or 650 or 750 or 850 or 950 has previously retrieved one or more MN service profiles, from the home AAA home server 114 and optionally a third party AAA server 114', said profiles including a local access profile to control initial service access of the MN 202 into the visited network 104. This can be achieved using any of the signaling options of FIGS. 5 through 9. At some later instance in time, the MN 202 seeks to request access to one of its configured remote access services by sending a remote access request message 1060 to a remote access gateway, which in FIG. 10 is remote home agent 112 in the home domain 102. The message 1060 may be forwarded through the access router 128 and addressed directly to the remote home agent 112, or as shown in FIG. 10 may be sent first to access router 128 and then onto the remote home agent 112. It could further be sent first to the access router 128 then to the local home agent 140 and next onto the remote home agent 112.

If the message 1060 includes information, such as an NAI and optional selector, which does match one of the existing MN service profiles in the access router 128, or indeed in any of the nodes through which message 1060 traverses, then the MN profile has previously been downloaded, and the profile should include information to indicate whether or not the target remote gateway, and the target remote access protocol is allowed by that profile, as well as information describing any associated facilities and limitations. Examples of remote access protocols are standard MIP remote access, standard (point to point tunneling protocol (PPTP) remote access and standard IP Security (IPSEC) remote access, all such protocols using the local home address as a tunnel address, said address having been assigned to the MN from the local home agent as part of message 550,560,750,850, or 950 and the associated AAA signaling and processing.

The invention shall be further discussed using MIP remote access as an example. However, the invention is also applicable to other remote access protocols such as, for example, standard PPPTP remote access, standard IPSEC remote access, all such protocols using the local home address as a tunnel address, etc.

In another embodiment of the invention, if the MIP signaling message 1060 includes information, such as an NAI and optional selector, which does not match any existing MN service profiles in the access router 128, or indeed in any of the nodes through which message 1060 traverses, then the access router 128 and/or other such node can issue an AAR message 1055a, to its AAA server in its domain, for example AAA server 135 in visited domain 104 for access router 128, to retrieve that MN service profile via AAR message 155b using the information in message 1060. In an embodiment of the invention shown FIG. 10, the remote access profile may be retrieved from the home AAA server 114 via messages 1055a, 1052a, 1052b, 1055b or from some combination of the third party server 114' and the home AAA server 114 using messages 1055a, 1052a 1056a, 1056b, 1052b, and 1055b. The NAI contents of the message 1060a from the MN will indicate which of the two messages sequences will be followed.

The remote access profile can be distributed between the third party 114' and the home AAA server 114, can be stored in the home AAA server 114 and be checked by the third party AAA server 114', or can be stored in the third party AAA server 114' and checked by the home AAA server 114.

The home AAA server 114 is involved in this example of the invention because the remote access gateway is in the home domain 102 so that the home AAA server 114 is able to securely communicate the necessary MIP security and configuration information to the relevant MIP remote access nodes (a subset of the MN, access router, local home agent and remote home agent) according to the routing of the MIP message 1060.

Figure 11:
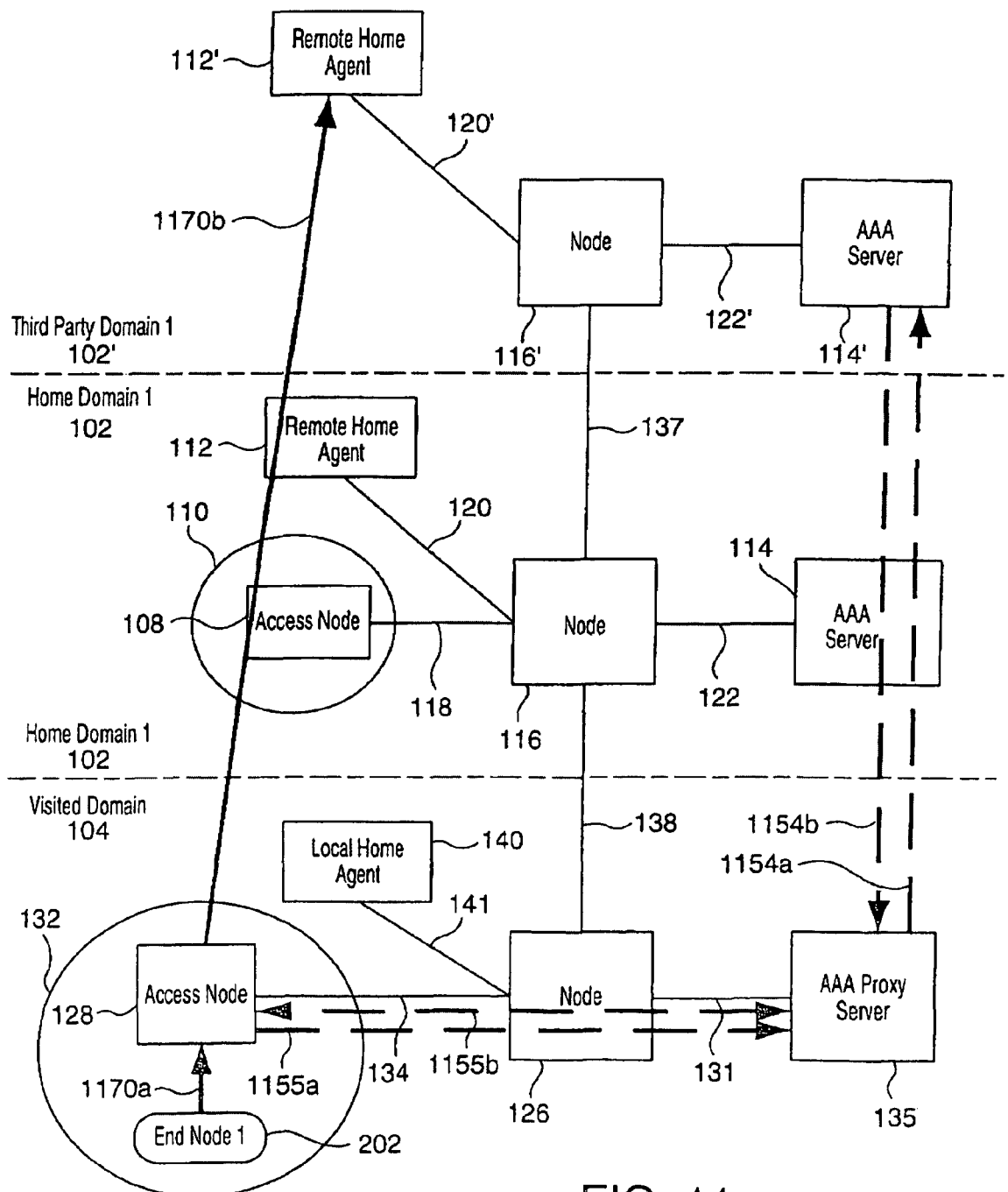

FIG. 11 shows an alternate example of the invention wherein the remote access service request message 1170 is directed at the third party remote home agent 112' which can traverse any of the following: access router 128, local home agent 140 and remote home agent 112. In FIG. 11 it is shown traversing the access router 128 on its way to the remote access router 112' in the third party domain. The AAR messages therefore also visit the third party AAA server 114' so that access to said home agent 112' can be managed. This can be achieved by messages 1155a, 1155b and message 1154a, 1154b bypassing the home AAA server 114 from which the MN 202 local access profile was retrieved. However, if the message 1170 traverses remote home agent 112 then the associated AAA messages must also visit home AAA server 114 so that the home AAA server 114 can again configure the remote access home agent 112 in the home domain. Therefore, a combination of messages 1155a, 1155b, 1152a, 1152b and 1156a, 1156b can then be used, and the MN profile retrieval processing can then further be distributed across the home and third party AAA servers 114, 114' as described for FIG. 10.

In FIGS. 10 and 11, the access node 128 may have received as part of the earlier local access service request, information on service profile indicators such as NAIs, and remote access gateway addresses and allowed remote access protocols that are valid for the MN. The access node 128 can then, on receiving message 1060a or 1170a, compare the service profile indicators and other information in those messages with the information in the MN profile. The Access Node 128 can then avoid issuing AAA messages for remote access service requests which are explicitly barred. Exemplary examples of service profile indicators that can control remote access requests, are a list of known NAI and selectors for that MN, a wildcard NAI that allows any remote access requests to any third party domain 104, and a wildcard NAI which allows remote access to any username in a specific realm that is named in said NAI.

In various embodiments, visited AAA server 135 is not traversed according to standard AAA proxy rules. This is because known rules do not allow the visited AAA server 135 to be configured with information received from the home or third party AAA servers 114, 114'. Standard AAA proxy rules also do not support the special NAI format used in various messages in accordance with the invention, where a single NAI includes multiple NAIs or sufficient information to generate multiple NAIs, and/or associated routing functionality. The visited AAA server 135 requires, in some cases, specific information to manage access to its local home agent and enable MIP configuration so that AAA information can be securely received from, combined, and/or delivered to the access router 128 and the local home agent 140 from one or more home and third party AAA servers 114,114'. Further, in various implementations home AAA server 114 does not use standard AAA proxying rules because again the home AAA server should be able to support the special NAI format and routing, the combining of partial profiles and multiple profiles for an NAI, the profile checking functionality and/or the ability to configure its remote access home agent 112 in addition to the third party AAA server 114' configuring its remote access home agent 112.

Figure 12:
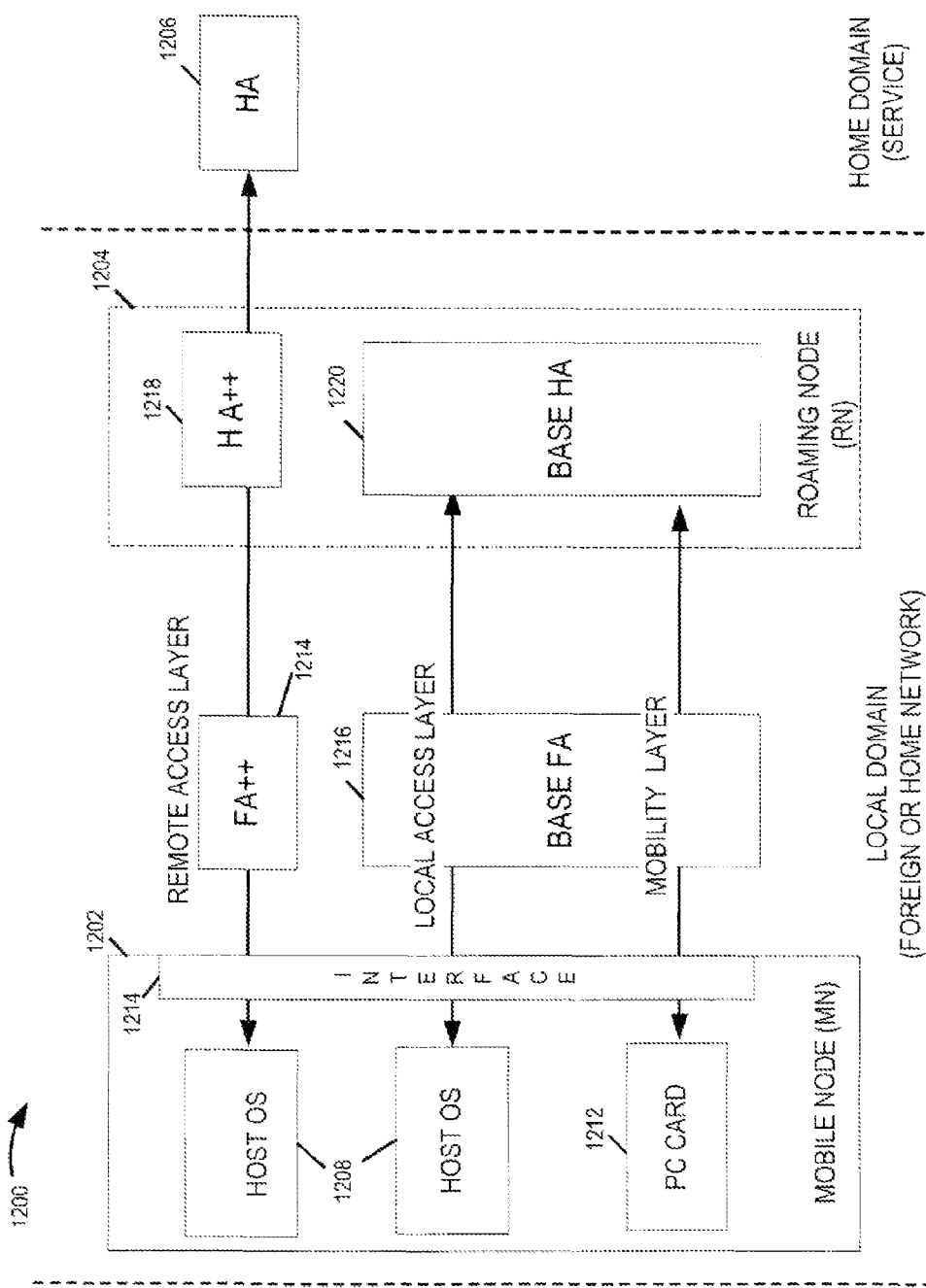
FIG. 12 illustrates an exemplary embodiment in which a mobile node obtains local and remote access services.

FIG. 12 shows an exemplary embodiment 1200 in which a Mobile Node 1202 obtains local and remote access services, e.g., via access node components such as an enhanced Foreign Agent component FA++1214 and a Base Foreign Agent component BASE FA 1216, in accordance with an exemplary embodiment. Various signaling is performed via the FA++1214 and BASE FA 1216 which may be part of an access node located between the mobile node 102 and Roaming Node 1204. As shown in FIG. 12, the roaming node 1202 includes an enhanced home agent component HA++1218 and a base home agent component 1220. Roaming node 1204 is coupled to home agent HA 1206 which operates as the home agent of the mobile node 1202. The mobile node 1202 is implemented so that the mobility layer is protected by the PC card 1212 which provides an address to the MN interface 1202. Then above this, and fully exposed to the MN host OS 1208 which performs remote access layer and local access layer signaling is the roaming layer. This separation means that host OS bugs, performance and preferences, in at least some embodiments, cannot affect the mission critical operator controlled mobility layer which is controlled by the PC card 1212. It also means that the roaming model can be independent of the mobility solution (nested model) or that a MIP stack can be added to the host OS components to work with the PC card 1212 in setting up concatenated roaming in conjunction with the mobility layer. The FA++1214 is included in addition to the Base FA 1216 in the foreign agent while the HA++component is included in the roaming node 1202 in addition to the base home agent component 1220 to support the carriage of MIP signaling through these elements and the forwarding of concatenated remote access signaling.

In the exemplary FIG. 12 system 1200 the PC card 1202 intercepts Foreign Agent Advertisements (FAAs), and hides FA movement information before passing RN movement information to the host OS 1208. When the host OS 1208 sees an RN change then it will request a new IP address via a DHCP to replace an old RoA with a new RoA. The new RoA can then be promoted if required to a remote access address if necessary. In a basic model, the MN connects to its home network and has a dialogue with the home wireless network operators AAA server (AAA-HN). A user profile can allow local access and intra-domain remote access in parallel or sequentially.

In various embodiments nodes described herein are implemented using one or more modules to perform the steps corresponding to one or more methods of the present invention, for example, signal processing, message generation and/or transmission steps. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware, to perform one or more of the steps of the above-described method(s).

Numerous additional variations on the methods and apparatus of the present invention described above will be apparent to those skilled in the art in view of the above description of the invention. Such variations are to be considered within the scope of the invention. The methods and apparatus of the present invention may be, and in various embodiments are, used with CDMA, orthogonal frequency division multiplexing (OFDM), or various other types of communications techniques which may be used to provide wireless communications links between access nodes and mobile nodes. In some embodiments the access nodes are implemented as base stations which establish communications links with mobile nodes using OFDM and/or CDMA. In various embodiments the mobile nodes are implemented as notebook computers, personal data assistants (PDAs), or other portable devices including receiver/transmitter circuits and logic and/or routines, for implementing the methods of the present invention.

Among other things, the present invention is directed to modules including software and/or hardware used to control one or more nodes to generates, process and/or transmit messages in accordance with the novel techniques discussed above. In addition, the present invention is directed to machine readable medium, e.g., memory, buffers, disk, etc. that are used by various network nodes to store the novel messages of the present invention, e.g., as part of a message generation, transmission, reception and/or processing operation.

Numerous variations on the above described inventions will be apparent to those of ordinary skill in the art based on the above description. Such variations are to be considered within the scope of the invention.

What is claimed is:

1. A method of operating an access node in a communications network, the method comprising:
   receiving an access request message from a mobile node;
   retrieving both a local access service profile corresponding to said mobile node and a remote access service profile corresponding to said mobile node from a server located in a home domain of said mobile node;
   providing a local access service to said mobile node using said retrieved local service profile; and
   providing a remote access service to said mobile node using said retrieved remote access service profile.

2. The method of claim 1, wherein said mobile node and said access node are in a visited domain which is different from the home domain of said mobile node.

3. The method of claim 2, wherein retrieving both the local access service profile corresponding to said mobile node and the remote access service profile corresponding to said mobile node from the server located in the home domain of said mobile node includes:
   generating a request message used to retrieve service profile information based on the received access request message;

sending the generated request message to a proxy server; and receiving local service profile information and remote service profile information from said proxy server, said local service profile information and said remote service profile information having been provided to said proxy server by the server in the home domain of said mobile node.

4. The method of claim 2, further comprising:
forwarding said received access request message to a local home agent in the visited domain.

5. The method of claim 2,
wherein said access request message includes a first service profile indicator corresponding to said local access service profile and a second service indicator corresponding to said remote access service profile.

6. The method of claim 2,
wherein said access request message includes a service profile indicator and a plurality of different profile selectors used to indicate which of a plurality different mobile node service profiles stored in said server located in the home domain of said mobile node are to be retrieved in response to the access request message.

7. The method of claim 2,
wherein providing a local access service includes using an address from a local home agent in the visited domain; and
wherein providing a remote access service includes using a remote access address provided by a remote home agent, said remote home agent being located in the home domain of said mobile node.

8. The method of claim 1, wherein said remote access service profile includes a remote access address assigned to said mobile node by a home agent of the mobile node in the home domain of the mobile node.

9. An access node in a communications network, comprising:
at least one processor configured to control said access node to:
receive an access request message from a mobile node;
retrieve both a local access service profile corresponding to said mobile node and a remote access service profile corresponding to said mobile node from a server located in a home domain of said mobile node;
provide a local access service to said mobile node using said retrieved local service profile; and
provide a remote access service to said mobile node using said retrieved remote access service profile; and
a memory coupled to said at least one processor.

10. The access node of claim 9, wherein said mobile node and said access node are in a visited domain which is different from the home domain of said mobile node.

11. The access node of claim 10, wherein as part of said retrieving both the local access service profile and the remote access service profile said at least one processor is further configured to control said access node to:
generate a request message used to retrieve service profile information based on the received access request message;
send the generated request message to a proxy server; and
receive local service profile information and remote service profile information from said proxy server, said local service profile information and said remote service profile information having been provided to said proxy server by the server in the home domain of said mobile node.

12. The access node of claim 10, wherein said at least one processor is further configured to control said access node to:
forward said received access request message to a local home agent in the visited domain.

13. The access node of claim 10,
wherein said access request message includes a first service profile indicator corresponding to said local access service profile and a second service indicator corresponding to said remote access service profile.

14. An access node in a communications network, comprising:
means for receiving an access request message from a mobile node;
means for retrieving both a local access service profile corresponding to said mobile node and a remote access service profile corresponding to said mobile node from a server located in a home domain of said mobile node; and
means for providing a local access service to said mobile node using said retrieved local service profile and for providing a remote access service to said mobile node using said retrieved remote access service profile.

15. The access node of claim 14, wherein said mobile node and said access node are in a visited domain which is different from the home domain of said mobile node.

16. A non-transitory machine readable medium including machine executable instructions for controlling an access node in a communications network, said non-transitory machine readable medium comprising:
instructions for causing the access node to receive an access request message from a mobile node;
instructions for causing the access node to retrieve both a local service profile corresponding to said mobile node and a remote service profile corresponding to said mobile node from a server located in a home domain of said mobile node;
instructions for causing the access node to provide a local access service to said mobile node using said retrieved local service profile; and
instructions for causing the access node to provide a remote access service to said mobile node using said retrieved remote access service profile.

17. A method of operating a mobile node in a visited domain, the method comprising:
transmitting, to an access node in the visited domain, an access request message to obtain access to at least two different access services, said access request message including service profile identification information corresponding to two different service profiles stored on a server in a home domain of said mobile node; and
using, via the access node, said at least two different access services, said two different access services including a local access service and a remote access service.

18. The method of claim 17, wherein said two different access services are used concurrently, use of said local access service including use of an address from a local home agent in the visited domain, use of said remote access service including use of a remote access address from a remote home agent in the home domain of said mobile node.

19. The method of claim 17, wherein said service profile identification information includes:
a first service profile indicator corresponding to a local access service profile used by said access node to provide said local access service to said mobile node; and
a second service profile indicator corresponding to a remote access service profile used by said access node to provide said remote access service to said mobile node.

20. The method of claim 19, wherein at least one of said first and second service profile indicators includes a network address identifier of the mobile node.

21. The method of claim 20, wherein said access request message is a mobile IP message.

22. The method of claim 17, wherein said service profile identification information includes:
a service profile indicator and a plurality of different profile selectors, said different profile selectors being used to indicate which of a plurality different mobile node service profiles, stored in said server located in the home domain of said mobile node, are to be retrieved in response to the access request message.

23. The method of claim 22,
wherein said access request message is a Mobile IP (MIP) access request message; and
wherein said different profile selectors are different MIP signaling flags, said access request message including a MIP signaling flag corresponding to a local access service profile and another MIP signaling flag corresponding to a remote access service profile.

24. The method of claim 23, wherein the profile indicator is a network address identifier corresponding to the mobile node.

25. A mobile node in a visited domain, comprising:
at least one processor configured to control said mobile node to:
transmit, to an access node in the visited domain, an access request message to obtain access to at least two different access services, said access request message including service profile identification information corresponding to two different service profiles stored on a server in a home domain of said mobile node; and
use, via the access node, said at least two different access services, said two different access services including a local access service and a remote access service.

26. The mobile node of claim 25, wherein said two different access services are used concurrently, use of said local access service including use of an address from a local home agent in the visited domain, use of said remote access service including use of a remote access address from a remote home agent in the home domain of said mobile node.

27. The mobile node of claim 25, wherein said service profile identification information includes:
a first service profile indicator corresponding to a local access service profile used by said access node to provide said local access service to said mobile node; and
a second service profile indicator corresponding to a remote access service profile used by said access node to provide said remote access service to said mobile node.

28. The mobile node of claim 27, wherein at least one of said first and second service profile indicators includes a network address identifier of the mobile node.

29. The mobile node of claim 28, wherein said access request message is a mobile IP message.

30. A mobile node in a visited domain, comprising:
means for transmitting, to an access node in the visited domain, an access request message to obtain access to at least two different access services, said access request message including service profile identification information corresponding to two different service profiles stored on a server in a home domain of said mobile node; and
means for using, via the access node, said at least two different access services, said two different access services including a local access service and a remote access service.

31. The mobile node of claim 30, wherein said two different access services are used concurrently, use of said local access service including use of an address from a local home agent in the visited domain, use of said remote access service including use of a remote access address from a remote home agent in the home domain of said mobile node.

32. The mobile node of claim 30, wherein said service profile identification information includes:
a first service profile indicator corresponding to a local access service profile used by said access node to provide said local access service to said mobile node; and
a second service profile indicator corresponding to a remote access service profile used by said access node to provide said remote access service to said mobile node.

33. A non-transitory machine readable medium including machine executable instructions for controlling a mobile node in a visited domain, said non-transitory machine readable medium comprising:
instructions for causing the mobile node to transmit, to an access node in the visited domain, an access request message to obtain access to at least two different access services, said access request message including service profile identification information corresponding to two different service profiles stored on a server in a home domain of said mobile node; and
instructions for causing the mobile node to use, via the access node, said at least two different access services, said two different access services including a local access service and a remote access service.

* * * * *